US010325264B2

(12) United States Patent
Joyce et al.

(10) Patent No.: US 10,325,264 B2
(45) Date of Patent: *Jun. 18, 2019

(54) ENHANCED COMMUNICATION PLATFORM AND RELATED COMMUNICATION METHOD USING THE PLATFORM

(71) Applicant: Upaid Systems, Ltd., Road Town (VG)

(72) Inventors: Simon James Joyce, Bangkok (TH); Prafulla C. Gupta, Pagosa Springs, CO (US); Manohar Sitaram Vaidya, Hyderabad (IN); Rajesh Alla, Secunderabad (IN); Ashok Kumar Reddy Eanuga, Budd Lake, NJ (US); Sreeramamurty Ayalasomayajula, Sussex, WI (US); Richa Gupta, Hyderabad (IN); Alok Kaushal, Hyderabad (IN); Varma Laxmi Jagannadha Siva Kumara Jampana, Apple Valley, MN (US); Prasad Naganianeya Vara Undavalli, Columbus, IN (US); Kondal Rao Nallajerla, Alpharetta, GA (US); Sivaramayya Bonagiri, Hyderabad (IN); Krishna Mohan Sistla, Hyderabad (IN); Amba Prasad Gudipati, Hyderabad (IN); Biswajit Sundar Ray, Charlotte, NC (US); Raghuram Govindacharyula, Plano, TX (US); Penumatsa Janakirama, Hyderabad (IN); Veerabhadra Rao Kalluri, Secunderabad (IN); Ravi Devi Venkata Sathi, St. Louis, MO (US); Ramkumar Katchapeswaran Mambakkam, Irving, TX (US); Surya Sekhar Lakshmi Velpuri, Hyderabad (IN); Bhanu Murthy Nallagonda, Secunderabad (IN)

(73) Assignee: Upaid Systems, Ltd., Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,468

(22) Filed: Nov. 2, 2018

(65) Prior Publication Data

US 2019/0073673 A1 Mar. 7, 2019

Related U.S. Application Data

(63) Continuation of application No. 15/221,324, filed on Jul. 27, 2016, now Pat. No. 10,127,555, which is a
(Continued)

(51) Int. Cl.
*H04M 15/00* (2006.01)
*G06Q 20/40* (2012.01)
(Continued)

(52) U.S. Cl.
CPC .......... *G06Q 20/405* (2013.01); *G06Q 20/00* (2013.01); *G06Q 20/32* (2013.01); *G06Q 20/325* (2013.01);
(Continued)

(58) Field of Classification Search
USPC .................... 379/114.01, 114.03, 114.05, 379/114.15–114.17, 114.2, 144.08;
(Continued)

(56) References Cited

U.S. PATENT DOCUMENTS 4,087,630 A 5/1978 Browning et al.
4,439,636 A 3/1984 Newkirk et al.
(Continued)

FOREIGN PATENT DOCUMENTS

DE 19938201 A1 2/2001
EP 0698987 A2 2/1996
(Continued)

US 10,325,264 B2

Page 2

OTHER PUBLICATIONS

Communication from Japanese Patent Office for Japanese Patent Application No. 2003-509751; dated Jul. 7, 2008 [Cited in Parent].

(Continued)

*Primary Examiner* — Quoc D Tran
(74) *Attorney, Agent, or Firm* — Venable LLP; Jeffri A. Kaminski; Ryan T. Ward

(57) ABSTRACT

Pre-authorized communication services and/or transactions are provided via a plurality of networks in response to a request received from a user to provide at least one of a communication service, a transaction and user account information via a plurality of networks of different types. Prior to processing the request, there is verification of the user's authorization to receive the at least one of the communication service, the transaction, and the user account information, and that an account associated with the user has a sufficient amount currently available for payment of the at least one of the communication service and the transaction. After verification, an authorized account associated with the user is charged in real time as the at least one of the communication service and the transaction is provided.

28 Claims, 27 Drawing Sheets

Related U.S. Application Data continuation of application No. 14/581,118, filed on Dec. 23, 2014, now Pat. No. 9,432,377, which is a continuation of application No. 11/931,883, filed on Oct. 31, 2007, now Pat. No. 8,976,947, which is a continuation of application No. 10/684,396, filed on Oct. 15, 2003, now Pat. No. 7,308,087, which is a continuation of application No. 10/114,047, filed on Apr. 3, 2002, now Pat. No. 6,714,632, which is a continuation of application No. 09/851,382, filed on May 9, 2001, now Pat. No. 6,381,316, which is a continuation of application No. 09/395,868, filed on Sep. 14, 1999, now Pat. No. 6,320,947.

(60) Provisional application No. 60/100,440, filed on Sep. 15, 1998, provisional application No. 60/100,470, filed on Sep. 15, 1998.

(51) Int. Cl.

| | |
|---|---|
| *G06Q 20/00* | (2012.01) |
| *G06Q 20/32* | (2012.01) |
| *G06Q 20/34* | (2012.01) |
| *G06Q 20/36* | (2012.01) |
| *G07F 7/08* | (2006.01) |
| *G07F 7/10* | (2006.01) |
| *H04Q 3/00* | (2006.01) |
| *H04W 12/12* | (2009.01) |
| *H04L 29/06* | (2006.01) |
| *G06Q 20/38* | (2012.01) |
| *G07F 7/12* | (2006.01) |
| *H04W 12/10* | (2009.01) |

(52) U.S. Cl.
CPC ....... *G06Q 20/3224* (2013.01); *G06Q 20/347* (2013.01); *G06Q 20/363* (2013.01); *G06Q 20/3821* (2013.01); *G06Q 20/403* (2013.01); *G06Q 20/409* (2013.01); *G06Q 20/4016* (2013.01); *G07F 7/0866* (2013.01); *G07F 7/10* (2013.01); *G07F 7/1025* (2013.01); *G07F 7/122* (2013.01); *H04L 63/10* (2013.01); *H04L 63/126* (2013.01); *H04M 15/00* (2013.01); *H04M 15/68* (2013.01); *H04M 15/8038* (2013.01); *H04M 15/854* (2013.01); *H04Q 3/0029* (2013.01); *H04W 12/10* (2013.01); *H04W 12/12* (2013.01); *H04M 2215/0196* (2013.01); *H04M 2215/32* (2013.01); *H04M 2215/34* (2013.01); *H04M 2215/7442* (2013.01); *H04M 2215/8166* (2013.01); *H04Q 2213/13003* (2013.01); *H04Q 2213/1305* (2013.01); *H04Q 2213/1313* (2013.01); *H04Q 2213/1315* (2013.01); *H04Q 2213/1322* (2013.01); *H04Q 2213/1324* (2013.01); *H04Q 2213/1332* (2013.01); *H04Q 2213/1334* (2013.01); *H04Q 2213/13093* (2013.01); *H04Q 2213/13095* (2013.01); *H04Q 2213/13098* (2013.01); *H04Q 2213/13103* (2013.01); *H04Q 2213/13106* (2013.01); *H04Q 2213/13109* (2013.01); *H04Q 2213/13134* (2013.01); *H04Q 2213/13152* (2013.01); *H04Q 2213/13176* (2013.01); *H04Q 2213/13204* (2013.01); *H04Q 2213/13274* (2013.01); *H04Q 2213/13282* (2013.01); *H04Q 2213/13331* (2013.01); *H04Q 2213/13345* (2013.01); *H04Q 2213/13349* (2013.01); *H04Q 2213/13372* (2013.01); *H04Q 2213/13377* (2013.01); *H04Q 2213/13389* (2013.01); *H04Q 2213/13405* (2013.01)

(58) Field of Classification Search
USPC .................................. 455/405–408
See application file for complete search history.

(56) References Cited

U.S. PATENT DOCUMENTS

| | | |
|---|---|---|
| 4,807,275 A | 2/1989 | Enstrom |
| 4,825,130 A | 4/1989 | Enstrom |
| 4,975,942 A | 12/1990 | Zebryk |
| 5,003,584 A | 3/1991 | Benyacar et al. |
| 5,086,457 A | 2/1992 | Barraud et al. |
| 5,148,474 A | 9/1992 | Haralambopoulos et al. |
| 5,206,899 A | 4/1993 | Gupta et al. |
| 5,222,120 A | 6/1993 | McLeod et al. |
| 5,265,033 A | 11/1993 | Vajk et al. |
| 5,276,444 A | 1/1994 | McNair |
| 5,301,223 A | 4/1994 | Amadon et al. |
| 5,317,628 A | 5/1994 | Misholi et al. |
| 5,321,735 A | 6/1994 | Breeden et al. |
| 5,349,636 A | 9/1994 | Irribarren |
| 5,353,335 A | 10/1994 | D'Urso et al. |
| 5,359,642 A | 10/1994 | Castro |
| 5,440,621 A | 8/1995 | Castro |
| 5,511,114 A | 4/1996 | Stimson et al. |
| 5,524,142 A | 6/1996 | Lewis et al. |
| 5,537,464 A | 7/1996 | Lewis et al. |
| 5,557,516 A | 9/1996 | Hogan |
| 5,557,539 A | 9/1996 | Fitch |
| 5,572,005 A | 11/1996 | Hamilton et al. |
| 5,572,055 A | 11/1996 | Sumida |
| 5,577,100 A | 11/1996 | McGregor et al. |
| 5,577,109 A | 11/1996 | Stimson et al. |
| 5,586,173 A | 12/1996 | Misholi et al. |
| 5,586,175 A | 12/1996 | Hogan et al. |
| 5,590,181 A | 12/1996 | Hogan et al. |
| 5,608,778 A | 3/1997 | Partridge, III |
| 5,615,251 A | 3/1997 | Hogan et al. |

(56) References Cited

U.S. PATENT DOCUMENTS

| | | | |
|---|---|---|---|
| 5,621,787 A | 4/1997 | McKoy et al. |
| 5,633,909 A | 5/1997 | Fitch |
| 5,633,919 A | 5/1997 | Hogan et al. |
| 5,634,084 A | 5/1997 | Malsheen et al. |
| 5,638,430 A | 6/1997 | Hogan et al. |
| 5,661,781 A | 8/1997 | DeJager |
| 5,668,855 A | 9/1997 | Misholi et al. |
| 5,671,280 A | 9/1997 | Rosen |
| 5,677,955 A | 10/1997 | Doggett et al. |
| 5,692,037 A | 11/1997 | Friend |
| 5,692,132 A | 11/1997 | Hogan |
| 5,699,528 A | 12/1997 | Hogan |
| 5,712,908 A | 1/1998 | Brinkman et al. |
| 5,717,604 A | 2/1998 | Wiggins |
| 5,719,926 A | 2/1998 | Hill |
| 5,721,768 A | 2/1998 | Stimson et al. |
| 5,722,067 A | 2/1998 | Fougnies et al. |
| 5,737,395 A | 4/1998 | Irribarren |
| 5,737,414 A | 4/1998 | Walker et al. |
| 5,745,556 A | 4/1998 | Ronen |
| 5,749,075 A | 5/1998 | Toader et al. |
| 5,778,313 A | 7/1998 | Fougnies |
| 5,784,442 A | 7/1998 | Foti |
| 5,787,403 A | 7/1998 | Randle |
| 5,793,762 A | 8/1998 | Penners et al. |
| 5,825,863 A | 10/1998 | Walker |
| 5,826,185 A | 10/1998 | Wise et al. |
| 5,828,740 A | 10/1998 | Khuc et al. |
| 5,841,966 A | 11/1998 | Irribarren |
| 5,852,812 A | 12/1998 | Reeder |
| 5,854,975 A | 12/1998 | Fougnies et al. |
| 5,857,152 A | 1/1999 | Everett |
| 5,864,610 A | 1/1999 | Ronen |
| 5,867,566 A | 2/1999 | Hogan et al. |
| 5,870,473 A | 2/1999 | Boesch et al. |
| 5,878,215 A | 3/1999 | Kling et al. |
| 5,893,076 A | 4/1999 | Hafner et al. |
| 5,897,621 A | 4/1999 | Boesch et al. |
| 5,899,982 A | 5/1999 | Randle |
| 5,909,483 A | 6/1999 | Weare et al. |
| 5,909,486 A | 6/1999 | Walker et al. |
| 5,915,007 A | 6/1999 | Klapka |
| 5,915,093 A | 6/1999 | Berlin et al. |
| 5,915,226 A | 6/1999 | Martineau |
| 5,919,266 A | 7/1999 | Sud et al. |
| 5,920,562 A | 7/1999 | Christie et al. |
| 5,923,734 A | 7/1999 | Taskett |
| 5,930,767 A | 7/1999 | Reber et al. |
| 5,943,320 A | 8/1999 | Weik et al. |
| 5,943,406 A | 8/1999 | Leta et al. |
| 5,956,391 A | 9/1999 | Melen et al. |
| 5,960,069 A | 9/1999 | Felger |
| 5,960,416 A | 9/1999 | Block |
| 5,966,429 A | 10/1999 | Scherer |
| 5,974,146 A | 10/1999 | Randle et al. |
| 5,978,775 A | 11/1999 | Chen |
| 5,991,748 A | 11/1999 | Taskett |
| 6,006,257 A | 12/1999 | Slezak |
| 6,009,469 A | 12/1999 | Mattaway et al. |
| 6,014,636 A | 1/2000 | Reeder |
| 6,023,499 A | 2/2000 | Mansey et al. |
| 6,036,086 A | 3/2000 | Sizer, II et al. |
| 6,047,267 A | 4/2000 | Owens et al. |
| 6,047,284 A | 4/2000 | Owens et al. |
| 6,058,173 A | 5/2000 | Penfield et al. |
| 6,058,300 A | 5/2000 | Hanson |
| 6,061,664 A | 5/2000 | Pieterse et al. |
| 6,070,067 A | 5/2000 | Nguyen et al. |
| 6,070,185 A | 5/2000 | Anupam et al. |
| 6,081,791 A | 6/2000 | Clark |
| 6,091,944 A | 7/2000 | Friend |
| 6,092,053 A | 7/2000 | Boesch et al. |
| 6,092,055 A | 7/2000 | Owens et al. |
| 6,097,939 A | 8/2000 | Jacobs |
| 6,104,704 A | 8/2000 | Buhler et al. |
| 6,115,458 A | 9/2000 | Taskett |
| 6,115,714 A | 9/2000 | Gallagher et al. |
| 6,119,109 A | 9/2000 | Muratani et al. |
| 6,122,632 A | 9/2000 | Botts et al. |
| 6,137,870 A | 10/2000 | Scherer |
| 6,157,823 A | 12/2000 | Fougnies et al. |
| 6,173,174 B1 | 1/2001 | Jacobs |
| 6,185,198 B1 | 2/2001 | LaDue |
| 6,185,414 B1 | 2/2001 | Brunner et al. |
| 6,188,751 B1 | 2/2001 | Scherer |
| 6,188,752 B1 | 2/2001 | Lesley |
| 6,195,542 B1 | 2/2001 | Griffith |
| 6,205,207 B1 | 3/2001 | Scherer |
| 6,205,433 B1 | 3/2001 | Boesch et al. |
| 6,208,719 B1 | 3/2001 | Lo et al. |
| 6,213,390 B1 | 4/2001 | Oneda |
| 6,236,851 B1 | 5/2001 | Fougnies et al. |
| 6,246,755 B1 | 6/2001 | Walker et al. |
| 6,320,947 B1 * | 11/2001 | Joyce | G06Q 20/00 379/114.2 |
| 6,356,752 B1 | 3/2002 | Griffith |
| 6,381,316 B2 | 4/2002 | Joyce et al. |
| 6,434,378 B1 | 8/2002 | Fougnies |
| 6,434,379 B1 | 8/2002 | Despres et al. |
| 6,453,306 B1 | 9/2002 | Quelene |
| 6,480,710 B1 | 11/2002 | Laybourn et al. |
| 6,633,630 B1 | 10/2003 | Owens et al. |
| 6,694,300 B1 | 2/2004 | Walker et al. |
| 6,714,632 B2 | 3/2004 | Joyce et al. |
| 7,248,855 B2 | 7/2007 | Joyce et al. |
| 7,308,087 B2 | 12/2007 | Joyce et al. |
| 8,976,947 B2 * | 3/2015 | Joyce | G06Q 20/00 379/114.2 |
| 9,098,958 B2 | 8/2015 | Joyce et al. |
| 9,432,377 B2 * | 8/2016 | Joyce | G06Q 20/00 |
| 10,127,555 B2 * | 11/2018 | Joyce | G06Q 20/00 |
| 2003/0119478 A1 | 6/2003 | Nagy et al. |

FOREIGN PATENT DOCUMENTS

| | | |
|---|---|---|
| EP | 0921487 A2 | 6/1999 |
| EP | 1107198 A2 | 6/2001 |
| EP | 1107198 A3 | 7/2002 |
| GB | 2 171 877 A | 9/1986 |
| HU | 218 405 B | 7/1997 |
| HU | 218 134 B | 10/1999 |
| HU | 220 728 B1 | 12/1999 |
| HU | 0220734 B1 | 5/2002 |
| JP | 60-174547 A | 9/1985 |
| JP | 61-210754 A | 9/1986 |
| JP | 61-245664 A | 10/1986 |
| JP | 02-241171 A | 9/1990 |
| JP | 04-257092 B2 | 9/1992 |
| JP | 05-28457 A | 2/1993 |
| JP | 5-284257 B2 | 10/1993 |
| JP | 07-15564 A | 1/1995 |
| JP | 07-327094 A | 12/1995 |
| JP | 09-214640 A | 8/1997 |
| JP | 09-245104 A | 9/1997 |
| JP | 09-259085 A | 10/1997 |
| JP | 9-259193 A | 10/1997 |
| WO | 96/15616 A2 | 5/1996 |
| WO | 96/34483 A1 | 10/1996 |
| WO | 97/14124 A1 | 4/1997 |
| WO | 97/22191 A1 | 6/1997 |
| WO | 97/33416 A1 | 9/1997 |
| WO | 97/41530 A1 | 11/1997 |
| WO | 97/48078 A2 | 12/1997 |
| WO | 98/18251 A2 | 4/1998 |
| WO | 98/21874 A1 | 5/1998 |
| WO | 98/52131 A1 | 11/1998 |
| WO | 00/16568 A1 | 3/2000 |
| WO | 00/32004 A1 | 6/2000 |
| WO | 00/56085 A1 | 9/2000 |
| WO | 00/58948 A1 | 10/2000 |
| WO | 00/69201 A1 | 11/2000 |
| WO | 01/03090 A1 | 1/2001 |
| WO | 01/11857 A1 | 2/2001 |

(56) References Cited

FOREIGN PATENT DOCUMENTS

| | | |
|---|---|---|
| WO | 01/43390 A2 | 6/2001 |
| WO | 01/43390 A3 | 12/2001 |
| WO | 03/010951 A1 | 2/2003 |

OTHER PUBLICATIONS

Search Report for Hungarian Patent Application No. P0400342 dated Jun. 22, 2004 [Cited in Parent].

* cited by examiner

FUNCTIONALITY PROVIDED BY PRINT VENDOR REPORT

FUNCTIONALITY PROVIDED BY MOVED CARDS REPORT

ENHANCED COMMUNICATION PLATFORM AND RELATED COMMUNICATION METHOD USING THE PLATFORM

CROSS-REFERENCE TO RELATED APPLICATIONS

This application is a continuation and claims priority of U.S. patent application Ser. No. 15/221,324, filed Jul. 27, 2016, which is a continuation U.S. patent application Ser. No. 14/581,118, filed Dec. 23, 2014, now U.S. Pat. No. 9,432,377, which is a continuation of U.S. patent application Ser. No. 11/931,883, filed Oct. 31, 2007, now U.S. Pat. No. 8,976,947, which is a continuation of U.S. patent application Ser. No. 10/684,396, filed Oct. 15, 2003, now U.S. Pat. No. 7,308,087, which is a continuation of U.S. patent application Ser. No. 10/114,047, filed Apr. 3, 2002, now U.S. Pat. No. 6,714,632, which is a continuation of U.S. patent application Ser. No. 09/851,382, filed May 9, 2001, now U.S. Pat. No. 6,381,316, which is a continuation of U.S. patent application Ser. No. 09/395,868, filed Sep. 14, 1999, now U.S. Pat. No. 6,320,947, and which claims priority of U.S. Patent Application Nos. 60/100,440 and 60/100,470, both filed Sep. 15, 1998, the contents of each being incorporated herein by reference.

BACKGROUND OF THE INVENTION

Field of the Invention

The present invention relates to communication systems for providing services to individual and corporate subscribers worldwide. More specifically, the invention relates to an advanced intelligent communication system that provides subscriber-requested services through existing communication switches even in those circumstances in which the hardware communication switch is not configured to provide such services. The system supports the use of personal identification number (PIN) access cards for use in fixed and mobile markets from any communication device located anywhere in the world and provides flexible call processing and switching services that deliver enhanced computer telephony capabilities, utilizing standard communication equipment and operating systems.

Description of the Related Art

Advanced communication services, such as call forwarding, call conferencing, and voice mail have long been available to individual and corporate subscribers of telephone services. However, because such services are dependent on telephone carrier equipment, and because not all telephone switches can presently support all available advanced communication services, many subscribers are still unable to take advantage of these services at their home or at their place of business. Furthermore, even though a subscriber may have such services available at his or her normal place for communication, the services may be unavailable should the user attempt access through another person's communication device, a personal computer, a portable telephone, or a public phone. In other words, access to such services is extremely limited B restricted by the equipment in use, the equipment offered by the telephone carrier, and the prior sign-up by the particular subscriber.

Specialized equipment and proprietary software are conventionally used to provide various advanced services on a telephone system, such as abbreviated dialing, password service, automatic alarm, multiline hunting, call forwarding (busy, no reply, unconditional, and selective), call accept (selective), call back, distinctive ringing, network voice mail, and interception service. When an analog telephone switch is used in the communication network, as is the case in many remote areas, few of these advanced services are available to the customer. Similarly, if a basic digital switch is used, some of the advanced services described above may not be available depending on the software of the digital switch.

Presently, when advanced telephony services are desired to be made available to network customers within an analog-switched network, a proprietary digital switch must be purchased along with a proprietary computer operating system and proprietary software. If the network uses a digital switch and advanced services are desired to be added to the network, a replacement digital switch and supporting software might have to be acquired. In either situation, an outdated, "legacy" switch is replaced with a "new generation" switch. In the alternative, some features can be added to an existing digital switch by upgrading the switch and its proprietary software. Whichever upgrade measure is taken, the process is expensive and time-consuming to acquire, install, test, and maintain the requisite hardware and software. Therefore, whether an analog switch is upgraded to a proprietary digital switching platform, such as those available from Lucent Technologies or Nortel, or an existing digital switch is upgraded to provide additional services, significant cost and effort are involved.

Therefore, time, effort, and expenses would be saved if there were a way to provide enhanced communication services to customers without replacing or upgrading existing legacy switches and supporting software. The platform and method (hereinafter collectively referred to as the "system") of the present invention meet such a need by interfacing with older "legacy" switches, whether analog or digital, and by operating on industry-standard computer platforms that satisfy telephone companies' functional and technical requirements.

In addition to hardware and software limitations, access to advanced communication services is further limited by the payment platform utilized by the customer. Access to and payment for communication services through the use of prepaid cards, such as telephone calling cards, is well known in the field of electronic communication. Such prepaid calling cards are sold at department stores, grocery stores, convenience stores, and other places of business. The prepaid calling cards can be produced in any specific amount or denomination, such as $10.00, $25.00, or $100.00, printed on the card. Also printed on the card are an access telephone number and additional instructional or promotional information. In addition, although typically not printed on the card, is a personal identification number (PIN) for authenticating the user. The access telephone number is the number to be initially dialed to interface with a host computer to access the desired communication service. To initiate a connection, the card holder first dials the access number, often a toll-free number; second, the card holder manually enters the associated PIN; and third, the card holder dials the telephone number of the location to be called.

Upon verification and authorization of the entered information and the prepaid card balance, the user is connected to the network. The access number links the cardholder to the computer host. Magnetic strip or bar code readers may also be used to decode information stored on the card, including an account code, but the additional step of manually entering a PIN is required by the user to complete a telephone call or another transaction. The PIN is intended to provide secured access to various services and features by limiting those services and features to users presumably authorized by virtue of their knowledge of the correct PIN; the PIN being verified to authenticate that the cardholder is a valid user. Once a call is placed using the telephone calling card, the charges for the call are billed to the card holders account or decremented from the card.

However, while prepaid calling cards have become a convenient method by which telephone calling services may be made available to customers worldwide, regardless of the telephone being used, such calling cards do not permit access to more advanced communication services, such as voice mail, call forwarding, or call conferencing. The reason for this limitation is that present networks limit calling card access to simple calls for which the account represented by the card may be either debited or charged. No integrated system exists that links calling card accounts with a database for offering more advanced services, such as a mailbox for voice mail messages or a pathway for conference calling or linking telephone numbers for call forwarding. In other words, card holders are presently constrained from using the calling card to access contracted, advanced communication services from any communication device worldwide for receiving desired, advanced communication services.

Another problem associated with the use of telephone calling cards through which advanced communication services may be purchased is the management, tracking, and accounting of such transactions. This problem arises because most communication systems permitting use of telephone calling cards are concerned primarily with the authorized payment of delivering such services and because prepaid telephone cards often are purchased as a commodity and no linking between card usage and an identifiable account, person, or corporation can be maintained. In short, the user does not have access to a comprehensive customer care system, which incorporates the administrative, card management, account management, security, customer care, and distribution management of a PIN access card system into a single software package on a public switched telephone network (PSTN) or any other communication network, without a need to purchase proprietary application software of the leading communication giants, such as Lucent, Norte!, etc.

The preferred embodiments of the present invention overcome the problems associated with existing mechanisms for delivering advanced communication services to customers, with or without use of PIN access cards by providing an easily implemented, cost-effective, "open standards" telephony solution that provides value-added services, such as voice mail, to people and businesses regardless of the sophistication of the switch to which they are connected, at a minimal cost to a local telephone company, service provider, or the subscribing consumer.

SUMMARY OF THE INVENTION

An object of the present invention is to provide enhanced communication services to users, regardless of where the users may be located in the world and regardless of the equipment through which the communication services are directed.

Another object of the present invention is to provide enhanced communication services to users through a PIN access card.

A further object of the present invention is to provide enhanced communication services to users through an interactive voice response system.

Objects and advantages of the present invention are achieved in accordance with embodiments of the present invention, such as a method of providing enhanced communication services to users, the method including receiving from a user a personal identification number; authenticating the personal identification number; accepting a request from the user for an enhanced communication service after authentication of the personal identification number; verifying that the user is authorized to receive the requested service and that an account linked to the personal identification number has sufficient value to pay for the service; providing, by an enhanced services platform, the enhanced communication service to the user; and charging the account for providing the enhanced communication service.

The enhanced communication service preferably is provided through a network, including one or more of a landline communication network, a wireless communication network, a wide area network, a global computer network, a cable network, and a satellite network. Also, a high level application programming interface executing on the enhanced services platform independent of any hardware connecting the platform to the network is preferably used in providing the enhanced communication service. Charging for providing the enhanced communication service includes decrementing a charge from a pre-paid user account or adding a charge to a credit account. The enhanced communication services provided by the enhanced services platform include outcalling, voice mail functions, and call conferencing functions. Additionally, administration functions, card management functions, account management functions, external carrier and rate plan functions, sales administration functions, and system security functions are provided, with all such enhanced communications services being accessed with a personal identification number access card. The enhanced services platform includes an interactive voice response system, and the enhanced communication services are accessed by a user through either an analog switch or a digital switch, without upgrading the switch.

Objects and advantages of the present invention are achieved in accordance with embodiments of the present invention, such as a method of providing enhanced communication services to users, the method including receiving from a user a request for an enhanced communication service; verifying, by an enhanced services platform, that the user is authorized to receive the enhanced communication service; and providing, by the enhanced services platform, the enhanced communication service to the user through a switch which is not configured to provide the enhanced communication service without the enhanced services platform.

The enhanced communication services provided by the enhanced services platform include call forwarding functions, call waiting functions, automatic alarm functions, abbreviated dialing functions, voice mail functions, call conferencing functions, call acceptance/rejection functions, call back functions, password functions, and interception functions.

Objects and advantages of the present invention are achieved in accordance with embodiments of the present invention, such as a telephony platform providing enhanced communication services to users, the telephony platform including an input device to receive a personal identification number and an enhanced communication service selection from a user; a storage device storing account data related to the user; a verification module authenticating the personal identification number, verifying that the user is authorized to receive the selected communication service, and verifying that the stored account data has a balance sufficient to pay for the selected enhanced communication service; and a processor programmed to provide the selected enhanced communication service after the verification module has successfully completed its processing.

The processor is programmed to include the cost of providing the user-selected enhanced communication service in the user's account data.

Objects and advantages of the present invention are achieved in accordance with embodiments of the present invention, such as a telephony platform providing enhanced communication services to users, the telephony platform including an input device to receive an enhanced communication service selection from a user; a storage device storing account data related to the user; a verification module verifying that the user is authorized to receive the selected communication service and that the stored account data has an account balance sufficient to pay for the selected enhanced communication service; and a processor programmed to provide the selected enhanced communication service after the verification module has successfully completed its processing.

Objects and advantages of the present invention are achieved in accordance with embodiments of the present invention, such as a method of providing enhanced communication services to users, the method including receiving from a user a personal identification number; authenticating the personal identification number; accepting a request from the user for an enhanced communication service; verifying that an account linked to the personal identification number has sufficient value to pay for the enhanced communication service; and providing, by an enhanced services platform, the enhanced communication service to the user.

Objects and advantages of the present invention are achieved in accordance with embodiments of the present invention, such as a telephony platform providing enhanced communication services to users, the telephony platform including an input device to receive a personal identification number and an enhanced communication service selection from a user; a storage device storing an account value linked to the personal identification number; a verification module authenticating the personal identification number and verifying that the stored account value has sufficient value to pay for the enhanced communication service; and a processor programmed to provide the enhanced communication service.

Objects and advantages of the present invention are achieved in accordance with embodiments of the present invention, such as a telephony platform providing enhanced communication services to users, the telephony platform including an input device to receive an enhanced communication service selection from a user; a storage device storing account data related to the user; a verification module verifying that the stored account data has an account balance sufficient to pay for the selected enhanced communication service; and a processor programmed to provide the selected enhanced communication service.

In a preferred environment, embodiments of the invention allow an access card system to be installed in any telephone network in the world, particularly in remote areas of the world where telephones and advanced network equipment are not easily accessible. The system provides advanced telephony services, such as outdialing, voice mail, and call conferencing services to customers, with a built-in rating engine for calculating usage charges, in any available public switched telephone network or any mobile telephone network. Charges for use of the system are preferably handled by an access card system, which includes call center services in a comprehensive operations support system that supports all critical business functions from creation to printing, distribution, sales, activation, and use of the access card products, and a comprehensive customer care system with access to customer care functions via a computer network implementing an easy to use interface, such as the world wide web. The system is available for individual (home) or corporate use.

The system preferably has an architecture supporting both prepaid and postpaid functionality in the same platform, regardless of the technological level of the switch utilized in the communication network. Because of this payment versatility, the system allows extensive account management functions, where management and administrative services provided business customers can differ from those offered home users.

In one embodiment, the system connects to an existing public switched telephone network (PSTN) switch and offers advanced communication services such as voice mail, call conferencing, call forwarding, call waiting, call accept, call reject, call hold, call park, and automatic alarm transparently to subscribers connected to the PSTN switch, without any upgrade in the PSTN switch. The system also provides subscribers with complete control over administrative services through an integrated interactive voice response system and password facility. This allows the PSTN provider to offer advanced communication services without upgrading the switches in the network and thus minimizing investment. These same advanced communication services can be made available by this system to telephony users over the Internet network or any online network, without the need of incorporating a traditional PSTN switch in the online network.

Preferred embodiments of the present invention also preferably support multiple vendor computer telephony integration (CTI) boards. This is achieved through design of a high level application programming interface (HAPI) that isolates the application software from the board-specific application programming interface. Thus the application software runs on most of the major CTI board vendors' hardware. Any new CTI board vendor can be supported very quickly due to the design of the HAPI.

BRIEF DESCRIPTION OF THE DRAWINGS

These and other objects and advantages of the present invention will become more apparent and more readily appreciated from the following description of the preferred embodiments, taken in conjunction with the accompanying drawings, of which.

DESCRIPTION OF THE PREFERRED EMBODIMENTS

While a prepaid telephone calling card is typically a plastic card embossed with an account code and imprinted with an access code, many possible techniques exist for utilizing such a concept to purchase communication services. The card may be plastic, metal, paper, or a memory chip with or without a processor. In addition to prepaid cards purchased prior to initiating a request for communication services, credit and debit cards are also well known to be utilized as telephone calling cards. For purposes of the preferred embodiments of this invention, all types of calling cards will be referred to with the term "access card" to indicate a device containing an access code and a link to a customers account for authorized access to and payment for communication services. Such a card encompasses any combination of the features of the previously discussed cards.

A preferred embodiment of the invention is readily implemented on a network by presently available communication apparatuses and electronic components. The preferred embodiments of the invention find ready application in virtually all communication systems, including but not limited to private and public telecommunication networks, cable networks, satellite networks, the Internet, and other broadcast networks.

Figure 1:
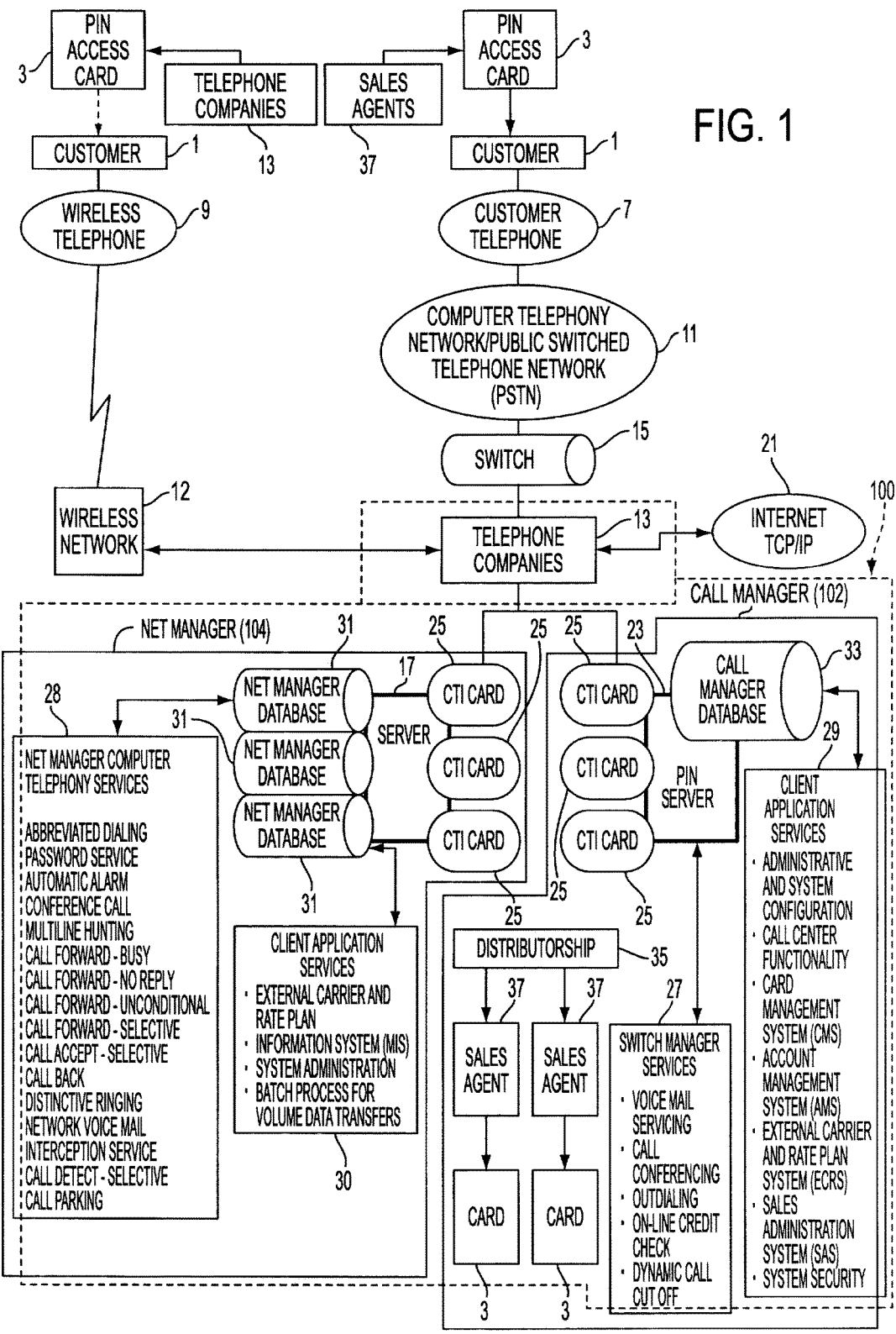
FIG. 1 is a block diagram of an embodiment of the present invention including an advanced intelligent network (AIN) platform executing software hereinafter referred to as CallManager™ and NetManager™.

Referring now to FIG. 1, there is illustrated a block diagram of a telephony platform 100 of a preferred embodiment of the invention, which incorporates CallManager™ 102 and NetManager™ 104 subsystems for access by any public system telephone network 11. Within the CallManager™ subsystem 102, a customer 1 uses a PIN access card 3 to access the computer telephony network 11 through a network of wireline telephones 7 or wireless telephones 9 by first dialing an access number provided to the customer 1 upon purchasing or signing up for the access card 3. The access card 3 may be a debit card, credit card, prepaid calling card, or limit card which permit expenditures up to a predetermined limit. The card itself may be a plastic or paper card with printed and/or encoded information on a magnetic strip, or a microchip, etc. The access number could be read by the telephone device 7 or 9 with a magnetic or bar code reader, or the user can visually read and subsequently dial the access number from information printed on the card. Furthermore, access could be directed through a personal computer, with the computer automatically dialing the access number upon user command.

The PSTN 11 of the local, regional, or national telephone company 13 receives the dialed telephone transmission through the local network of wireline telephones 7, through a wireless telephone 9, or through a personal computer (not shown) coupled to the PSTN via a computer network or a modem. From the PSTN 11, the call is routed by the network to a switch 15, where the switch 15 analyzes the access number and directs the call to a telephone call receiving device outside the telephony platform 100; or to a computer network, such as Internet TCP/IP network 21, or to the computer telephony interface cards (CTI) 25 of the telephony platform 100. For those calls directed to the CTI cards 25, the calls are directed either to the CallManager™ subsystem 102 of the telephony platform 100 through server 23 or to the NetManager™ subsystem 104 of the telephony platform 100 through server 17, as determined by the access number utilized. In summary and as will be discussed more thoroughly below, the subsystems of the CallManager™ 102 and the NetManager™ 104 take control of the call and deliver the desired advanced communication service to the customer 1 through the switch 15 across the PSTN network 11, even when the hardware of the switch 15 is not configured to deliver such services.

The CallManager™ subsystem 102 on the server 23 includes client application services 29 and Switch Manager™ services 27. Both sets of services have the ability to store information in the databases 33 of the server 23. The Switch Manager™ services 27 are telephony services directly available to a customer 1, through a PIN access card 3, that include voice mail services, call conferencing, and outdialing provided by software executing on the telephony platform 100. The software providing the Switch Manager™ services 27 includes an interactive voice response system to guide the customer through available options. The client application services 29 are also provided by software executing on the platform 100 and constitute a complete operation support system for use by the customers 1, the sales agents 37, the distributorships 35, and the call center agents 70 (see FIG. 2). The client application services 29 include, without limitation, administration and system configuration, call center functionality, a card management subsystem (including CardManager™), an account management subsystem, an external carrier and rate plan subsystem, a sales administration subsystem, and a security subsystem. The client application services 29 also provide a graphical user interface (not shown) and output device (not shown) for access to customer accounts and to usage information.

The CallManager™ subsystem 102 manages distribution of the PIN access cards 3 through distributorships 35, although the telephone companies 13 also have the option to distribute PIN access cards 3 to the customers 1. The distributorships 35 have sales agents 37 that disseminate the PIN access cards 3 to the customers 1. The sales agents 37 can be persons, convenience stores, or kiosks located in public areas. If the access cards 3 are prepaid calling cards, the customer 1 has the option of buying the cards 3 through the sales agents 37 of the distributorships 35 or directly purchasing the cards from the local, regional and central telephone companies 13.

The printing and creation of cards and billing information are all performed through the operation support subsystems referred to as the Card Manager™ component of the CallManager™ 102. CallManager™ may include a Billing Module that takes care of the billing aspects of the system. The Billing Module can be a complete billing system which may include a full-function rating engine. The rating engine or rate plan can determine the monetary value of a transaction, where such determination may be based on, but is not limited to, the origin of the transaction, the destination of the transaction, the type of transaction, and the time of day and/or day of week of the transaction.

Further, the rating engine or rate plan can provide for tariff setup and configuration information management for wireless networks. The Billing Module can also include rating engines for functionalities such as long distance calling, conferencing, and message mapping. Further, the Billing Module can provide for real-time debit or charge of a customers associated account after adding a service tax related to the transaction. Finally, the Billing Module may also be integrated with a service or transaction providers own billing system.

The billing module may contain a table for recording call data. The table may contain fields for recording information such as a card corporate ID, a card division information, a call extension code, a call type code, a call date, a call duration, a call destination, a call pulse, a call amount, a call tariff time, a call tariff zone, a record of whether the call has been billed or not and a bill number.

The billing module may also contain a table for recording home information. The home information table can contain fields such as a home main number, a home identification number, a title, a customer name, a customer address, a customer city, a customer state, a customer country, a customer zip, a customer phone number, a customer fax number, a customer email address, a customer remarks, a customer profession, a customer last bill date, a customer deposit amount, a customer credit limit, a customer credit limit left, a customer current balance, a customer number of active cards, a customer status and a customer status change date.

FIG. 1 also shows the advanced intelligent network (AIN) platform known as the NetManager™ subsystem 104. Within the NetManager™ subsystem 104, the server 17 can also preferably be a central office service enhancer that not only provides computer telephony service similar to that provided by the Switch Manager™ 27 included in the PIN server 23 of the CallManager™ subsystem, but also can provide additional telephony services 28 through an existing "legacy" switch 15 without the need for a public telephone company 13, Internet provider 21, or wireless network to upgrade to a digital switch function. In other words, NetManager™ 104 has the capability of providing a complete set of AIN switching services through its software modules and database accesses, independent of the technological level of the legacy switch 15. Furthermore, customer 1 access to the NetManager™ services 28 is not limited to a PIN access card.

The additional telephony services 28 may be divided into access code-based services, terminating services, PIN-based services, administrative services, and intelligent network (IN) services. The server 17, due to its open-architecture design, can also upgrade the switching capacity of the regional telephone company 13 by scaling the deployment of the additional telephony and administrative services at the open-system, client-server level rather than at the switch 15 level. Analogous to the databases 33 of PIN based server 23, server 17 has a plurality of databases 31 to store any of the information being fed through the server 17 to the computer telephony services 28. The clients of the server 17, in addition to the customer 1, include management, accounting, sales, and MIS. Furthermore, the NetManager™ 104 provides administrative and operational client application services 30 similar to some of the services provided under the client application services 29 of CallManager™ 102

The access code-based services of the computer telephony services 28 of NetManager™ 104 utilize calling line identification to activate the desired functionality when a predetermined code is dialed. These services include equal access, abbreviated dialing, automatic wake up service, call conference facility, billing inquiry, long distance/ISD with password, automated directory inquiry, on line help, information on demand, and Internet telephony.

A prime service of NetManager™ 104 is equal access, whereby any subscriber in any local exchange may select and have access to various long distance carriers available through that exchange. The equal access service enables pointing a subscriber to a long distance carrier, effecting a call over the lines of that carrier, and billing the call with the long distance carrier. Abbreviated dialing allows the subscriber to dial frequently accessed telephone numbers by dialing only short codes instead of the full telephone number. The subscriber can set or change these codes through the interactive voice response system. As to the automatic wake up service, the subscriber can program any time at which he/she wants to be awoken or reminded. The subscriber will be rung at the programmed time, whether a regular daily time or a single instance. The call conference facility permits the subscriber to initiate conference calls and bring two or more parties into a conference. The subscriber may drop any of the parties from the conference call at any time. Bill inquiry permits subscriber online or voice actuated access to the subscriber's billing information, including any balance remaining on account. Furthermore, bill inquiry allows a subscriber to make real-time billing inquiries, such as a balance inquiry if the user has a pre-paid associated account, or a cumulative amount inquiry if the users associated account is post-paid. The subscriber also can secure access to long distance calling by programming a security code/password as a prerequisite for completing a long distance call. Call reach is an integral part of this service in which the subscriber establishes limited call ranges by use of preprogrammed phone numbers to access specified areas and countries. The subscriber can utilize the automated directory inquiry service to obtain directory assistance. The found number may be auto dialed from this service. An extensive online help facility is available to the user through database 31. This facility includes instructions for various services and exemplary parameter configurations. Information on demand provides the subscriber with a single point source of information for subscriber information, services information, and marketing information. This information is available to the subscriber through facsimile and/or data transmissions. The Internet telephony service allows both mobile and PSTN calls to be routed onto an internet IP network at low cost and high quality of service.

The terminating services are initiated when a call terminates at a subscriber, invoking the pre-programmed services of that particular subscriber. These features of the computer telephony services 28 of the NetManager™ 104 include call forwarding (unconditional, busy, no reply, and selective), call park, call hold, call waiting, important call waiting, call screening (call reject and call accept), and multi-line hunting facility.

The call forwarding service has four conditional options. Unconditional forwarding allows a subscriber to forward all calls to another number. Call forwarding—busy allows the subscriber to designate another telephone number to receive calls should the primary number be busy. The no reply forwarding reroutes the call to a secondary number should the first number dialed fail to respond after a predetermined number of rings. Selective forwarding will forward calls in the above three scenarios only for calls originating from specific telephone numbers. The subscriber can alter any of the forwarding options from any phone. Call park allows a customer to set aside, or park, a call by dialing a parking code. While parked, a call is both placed on hold and disassociated from the line, so that the customer is free to place and receive calls, even on a single line. Any line in the business group may dial a retrieval code to be connected to the parked call. An optional timed recall service guards against calls being permanently ignored or forgotten after being parked. Call hold allows a customer to place any call on hold by flashing the switch hook and dialing a hold code. This service frees the line to originate another call. Only one call per station line can be held at a time. The original connection can be retrieved by flashing and dialing the call hold access code. If the customer hangs up with a party on hold, the customer is automatically rung back and connected to the held party. The call waiting service triggers a tone to a user engaged in a telephone call, notifying the user that another call is attempting connection. By flashing the switch hook, the called subscriber can talk to the third party while keeping the original party on hold. By flashing the hook switch again, the subscriber can talk to the original party who has been on hold. Important call waiting is similar to call waiting, except the subscriber is notified only if the incoming call is from a particular telephone number(s) that the subscriber has preprogrammed into the system. The call reject option of the call screening service allows a subscriber to filter out all incoming calls from specified numbers. The call accept service allows only specified numbers to ring through to the subscriber. Multi-line hunting allows subscribers, generally businesses, to request that multiple, non-contiguous telephone numbers be grouped. When one number is busy, an incoming call is automatically rolled to the next available number in the group.

The PIN-based services are keyed to the personal identification number assigned to the customer and are limited to the specific authority of each customer. These services include authentication, voice mail, system watch, and pre-paid billing.

Authentication provides for the validation of the personal identification number entered by a subscriber. This service also allows the activation and deactivation of the PIN numbers. As part of activation, the facility will retry activation following entry of an invalid PIN number. The number of retries is a configurable parameter. The system provides full feature voice mail for storage of messages. The subscriber can access his/her voice mail box with a preprogrammed PIN number and can selectively search for and review messages, delete messages, and permanently save messages. System watch permits online display of the status and occupancy of the lines and channels on an administrator's or operators console. Prepaid billing allows the subscriber to pay in advanced for a fixed dollar amount of services. Each time the subscriber makes a call or invokes a service, the system validates the requested call or service for balance amount and so advises the subscriber, including just prior to the balance being exhausted.

The administrative services include all parameter-driven services and activation or deactivation services. These services include easy feature configuration, system and traffic monitoring, subscriber information access, subscriber management, packaging of services, variable rate plans for different subscriber groups, MIS reports, security management, and open billing. Open billing provides an open interface for real-time billing, settlement, and reconciliation with third-party external-carrier or Customer Care and Billing systems. For example, the system has the ability to record account receivables: such as the following payments from corporate accounts, payments from home accounts, payments from voice mail accounts, and payments from dealers. In addition, the system has the ability to periodically bill subscribers for services offered by NetManager™ and also for services offered by third party providers.

Feature configuration permits the subscriber to preprogram and reprogram on demand the various configurable options, based on each subscribers preferences and requirements. The monitoring services permit the subscriber visual access to the activity level on the system, including alarm notification, idle status, busy status, and system statistics. The system maintains two levels of security, with each subscriber having secured access to subscriber services and parameters and with system supervisors having access to a second layer of options and controls.

The IN services are the intelligent network functions and include advanced services such as toll free service, premium rate calling (such as 1-900), emergency service (911), distinctive ringing, caller ID display, CENTREX services, full SS-7 functionality, universal personal number service, do not disturb, automatic call back, and opinion polling/TeleVoting.

Toll free calling provides for calls to be made to an "800" number toll free to the caller and chargeable to the telephone number "owner". Premium rate calling applies an additional rate or charge to calls made to A900" numbers, with the additional charge being passed on to the number "owner". Emergency service allows a caller abbreviated access to emergency services. When a call is made to an emergency number, such as 911, operators staffing the emergency center can view critical data associated with the call, such as name, address, telephone number, and geographical location of the call. Distinctive ringing provides for a different ring pattern or tone when the call originates from a specific telephone number(s). Caller ID displays the telephone number and associated subscriber name for incoming calls. Central exchange services are available to both calling and called customers. The universal personal number service allows a subscriber to have a specific, personal telephone number other than an ordinary directory number. The subscriber can designate any proximate telephone in the network as his/her "own". A call to the subscriber's universal personal number will ring through to the designated telephone. Similarly, any outgoing calls made on the designated telephone will be reflected on the subscribers bill. In this instance, the charging will be done to the universal personal number and not the number of the telephone utilized. The do not disturb service temporarily prohibits any call from ringing through to the subscriber's telephone. Instead, the call is handled through the call forwarding or the voice mail facility, depending on the options the subscriber has set up. Automatic call back is activated by the subscriber upon encountering a busy signal when the subscriber flashes the hook switch and enters a special code into the telephone. The busy number will be periodically polled by the system; and when the number is available, the subscriber's telephone will be rung and the connection completed when the subscriber lifts the handset. Opinion polling is activated by a subscriber establishing a designated telephone number, recording an instructional message, and coding various keyed caller entries to represent specific answers.

NetManager™ 104 includes an interactive voice response system which lets a subscriber use all of the services 28 of the system without using a touch tone telephone. NetManager™ 104 additionally provides at least the following functions: cost routing/intercarrier transactions, subscriber administration, advanced service provisioning, real time call rating/cutoff, caller authentication, call progress analysis, and AIN/CTI (advanced intelligent network/computer telephony interface) signaling network. The real-time rating/cutoff function supports real-time monitoring and rating of calls against a credit amount outstanding against a pre-paid account identified by, for example, a caller ID or a distinct account ID. Calls made by a pre-paid customer or received by a pre-paid customer can be debited from a customer's associated account in real-time. The rating/cutoff function is also capable of capturing the originating Phone ID on a real time basis and rating the calls at the appropriate rates depending upon the called location.

The rating/cutoff is approved by an approval module. The approval module can have an approval master table and an approval list table. The approval master table can contain approval code and approval description fields. The approval code filed in the approval master table can be linked to an approval code field in the approval list table. The approval list table can contain approval code, approval sequence number, approval submitted by, approval submitted date, approval status, approval remarks, approval information and parent sequence number fields. The approval list table can thereby approve or deny rating/cutoff based on the information in several fields, and maintain the approval information.

In addition, a security module can be used to control access to the approval module and overall system access. The security module can contain a pay module table, a pay database roles table, a pay operation table, a pay user roles table and a pay rights table. The pay module table can maintain all of the other modules in the graphical user interface. The pay database roles table can maintain roles assigned to system users. The pay operation table can store all the operations that a user can complete. The pay user roles table can be a link table for many-to-many relationships related to user notes in the database (i.e. administration, approval, need only).

If a call is attempted by a customer who is not a pre-paid customer and/or is not active on the system, then the call will not be completed by the system. The system also has the ability to inform the customer of his/her maximum allowable calling time, connect the call, and to inform a customer when a minimum-value threshold approaches. Warnings and accountbalance announcements may optionally be heard by the customer.

NetManager™ 104 is implemented using a fully modular software architecture, which permits ready maintenance, continuous enhancement, and ease and flexibility of implementation. NetManager™ 104 can run on industry standard PC platforms with telco grade working specifications, such as an ISA/PCI/CPCI based CTI server running a Windows NT 4.0 server supporting DNA. Additionally, NetManager™ 104 and CallManager™ 102 support both digital and analog interfaces.

Figure 2:
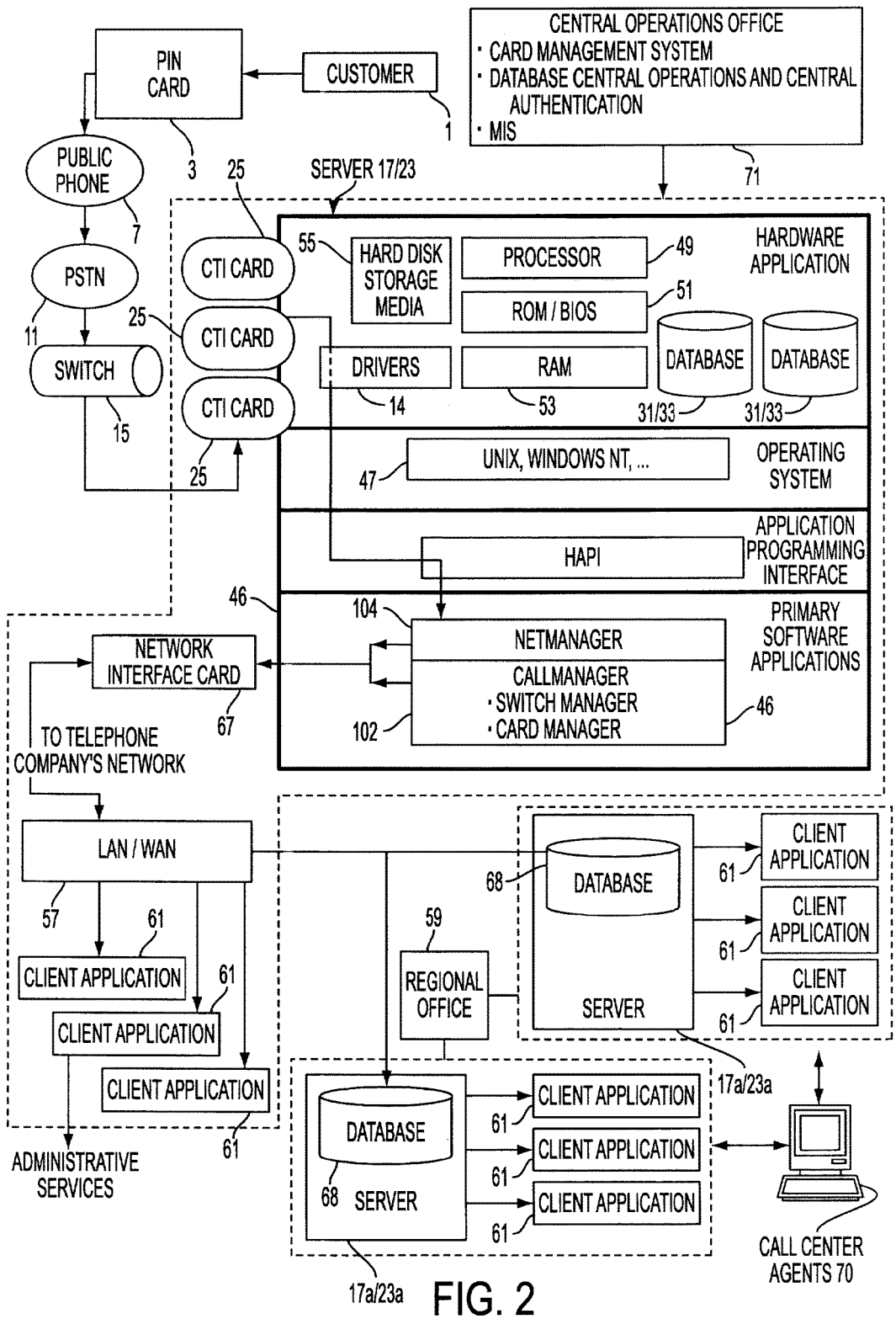
FIG. 2 is a block diagram of a central operations office server that incorporates the computer telephony capabilities, switch functions, network connections, and customer connections of CallManager™ and NetManager™.

Referring now to FIG. 2, the back end of servers 17 and 23 of the NetManager™ 104 and CallManager™ 102, respectively, are illustrated. Each server 17, 23 has at least three features categories: hardware components including related S/W drivers and databases 31 and 33 (see FIG. 1); an operating system 47, preferably Unix or Window NT; and software applications 46, preferably a PIN calling application having an operation support system collectively referred to as CallManager™ 102, or an enhanced computer telephony application operable on any switch system, known as NetManager™ 104. As in FIG. 1, the CTI cards 25 interface between the switch 15 and either software subsystem, CallManager™ 102 or NetManager™ 104, as a conduit connected to the public communication network 11 for the transmission and reception of information to and from the telephone device 7 or 9.

Primary hardware components of the servers 17 and 23 preferably include ROM/Bios 51, RAM 53, drivers 41, processor 49, and hard disk or other storage media 55, which are all located at the central operations office 71. The central operations office 71 contain servers for the card management subsystem, a MIS system, and a plurality of databases 31 and 33, including a central operations database and a central authentication database. The center 71 connects to a regional office 59 that includes a corresponding server(s) 17a, 23a that house databases 68 for supporting client applications 61 for regional operations, local authentication, sales administration, account management, external carrier and rate plan maintenance, and MIS. Additionally, regional databases 68 accept voice mail data.

The central operations office 71 and databases 31 and 33 operate in connection with the CallManager™ 102 server 23 and the NetManager™ 104 server 17, which connect to the telephone company, Lan/Wan 57, via a network interface card (NIC) 67 and, in turn, interact with one or a plurality of client applications 61 and regional offices 59. The regional offices 59 include a plurality of databases 68 for storing and retrieving information or for redirecting caller information. Each of these regional offices 59 have a number of application and administrative functions to effectively run the PIN telephony computer system in accordance with a preferred embodiment of the invention. Call Center Agents 70 have access to the regional databases 68 and can retrieve customer accounting and usage information to track account and service usage, generate invoices, and identify customer candidates for promotions and upgrades.

Figure 3:
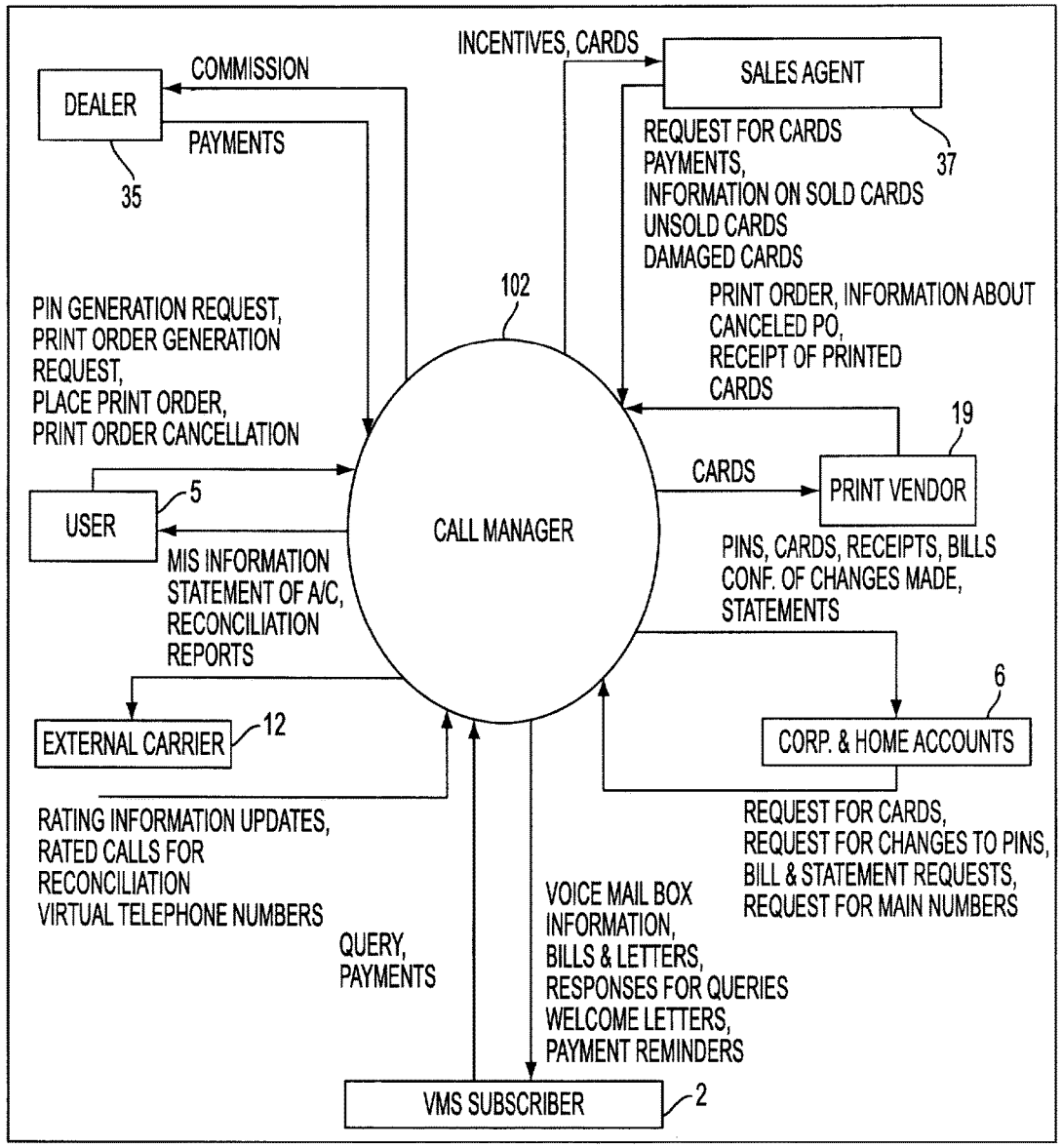
FIG. 3 is a block diagram of the primary subsystems contained within the CallManager™ subsystem.

The block diagram shown in FIG. 3 reflects the interactive services of the CallManager™ subsystem 102, which has links connecting the subsystem to the various users of the system, including users 5, dealers 35, external carriers 12, voice mail subscribers (VMS) 2, sales agents 37, print vendors 19, and corporate and home accounts 6. The users 5 include authorized customers 1 and call center agents 70. The primary function of CallManager™ 102 is to receive electronic transmissions from any and all of the various users of the system and respond to each user in kind, utilizing the data stored in the server 23 databases 33 of the system.

Transmissions received by the CallManager™ include an activation code to activate a PIN access card, a pin number for authentication, an out-dial number, a call continuation request, a voice mail box number, a voice mailbox password navigation request, a voice mail message to poll, a request for connection to the call center, and any queries by the subscriber. After receiving such information, the Switch Manager™ 27, which is a subsystem of the CallManager™ subsystem 102, transmits the following exemplary information back to the callers/subscribers or performs the following functions: authentication of a PIN number followed by a greeting and a menu of options, money balance left in a customers account, talk time left based on a customers account balance, a call cut-off warning when a customers account balance is approaching zero or its limit, help information/prompts, call connection to out-dialed numbers or mail boxes, recorded voice mail messages, or connection to call centers.

Figure 4:
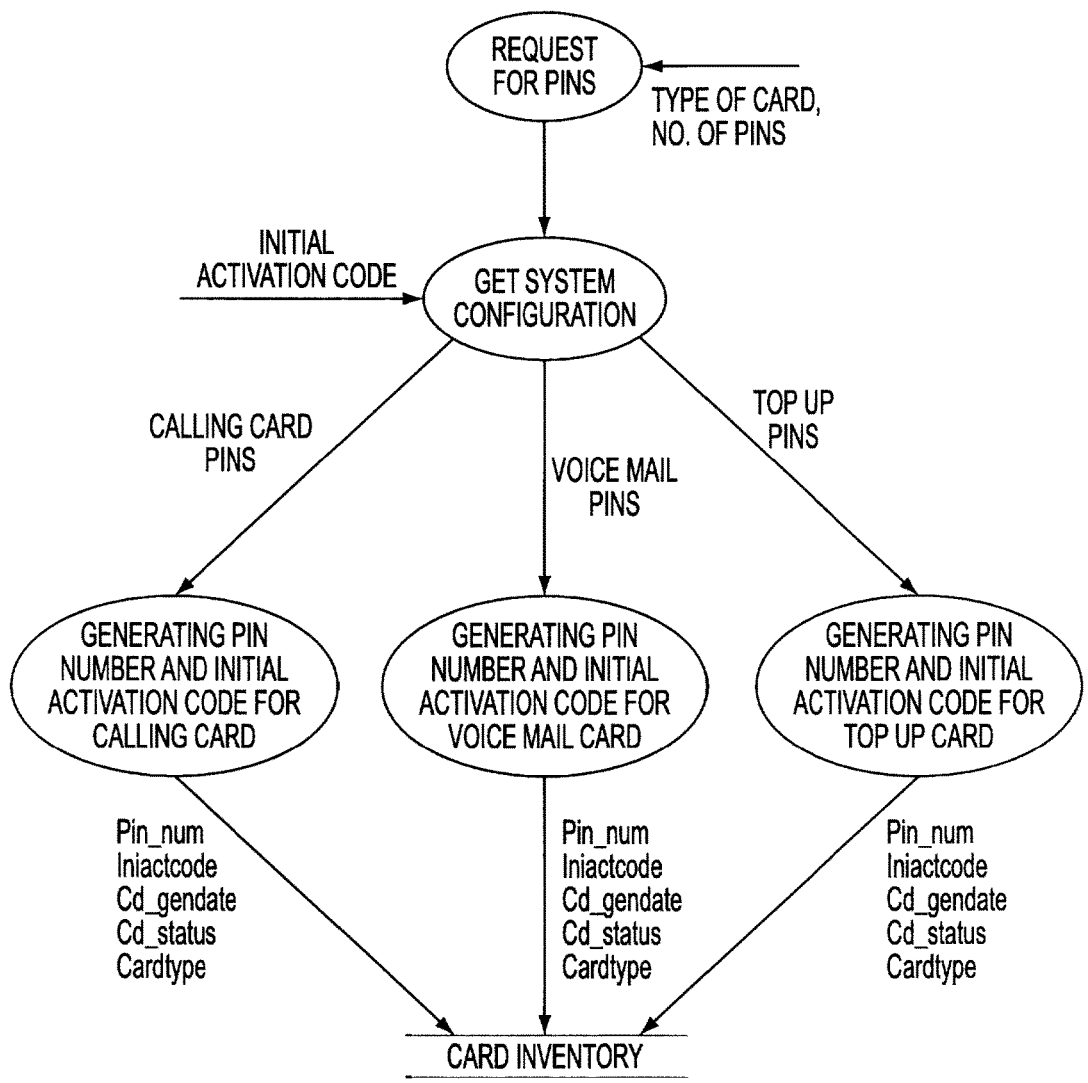
FIG. 4 is a flow chart of the system of generating PINs that are assigned to cards used within the CallManager™ subsystem.
Figure 5:
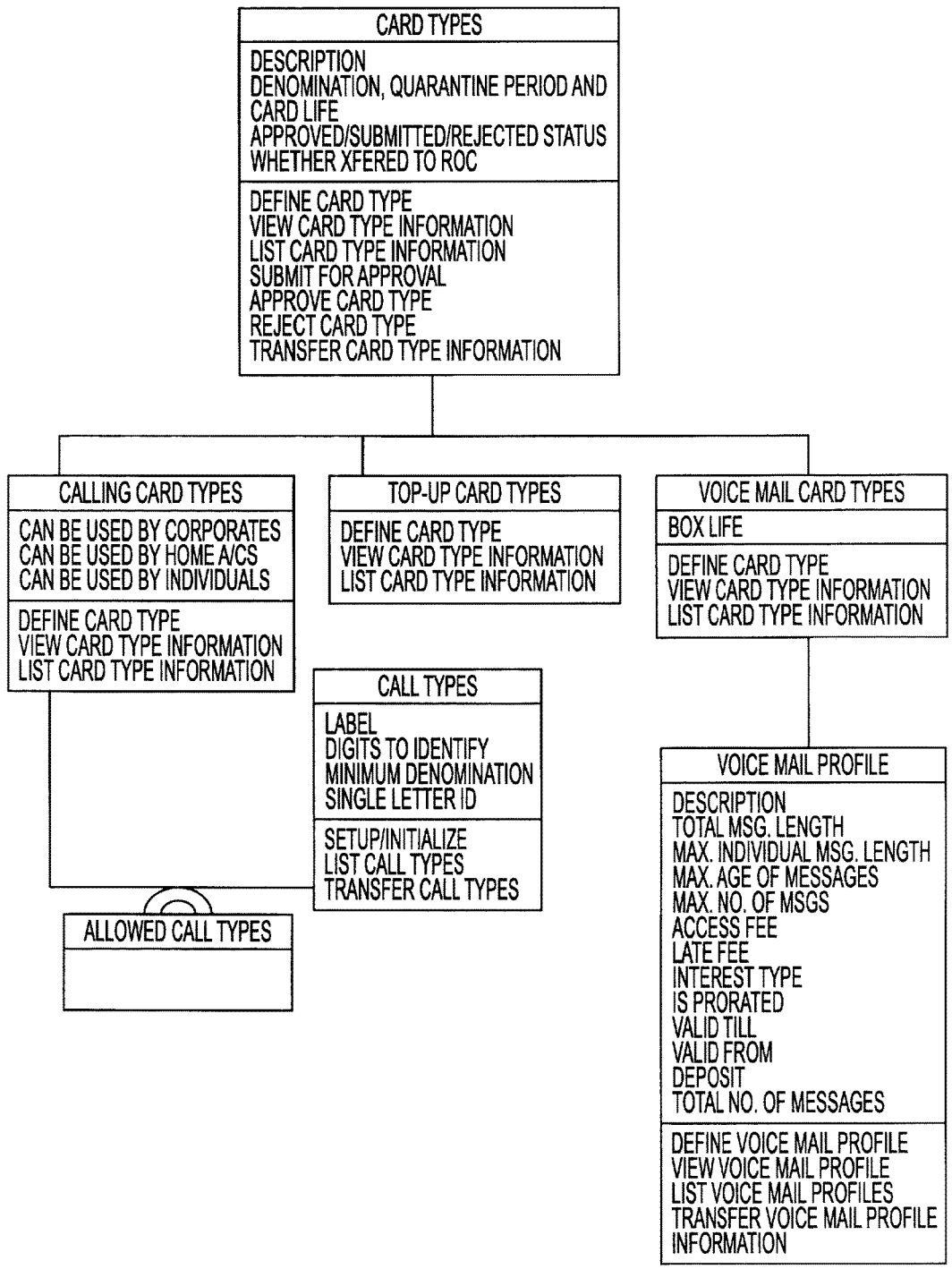
FIG. 5 is a block diagram of the data structures for card type definition.
Figure 6A:
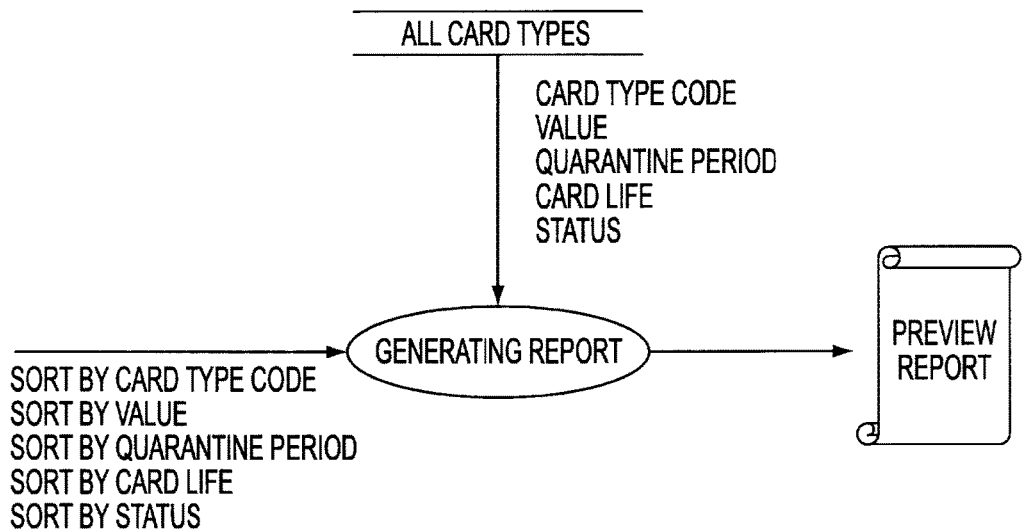
FIGS. 6A and 6B are flow charts of the creation of access card reports.
Figure 6B:
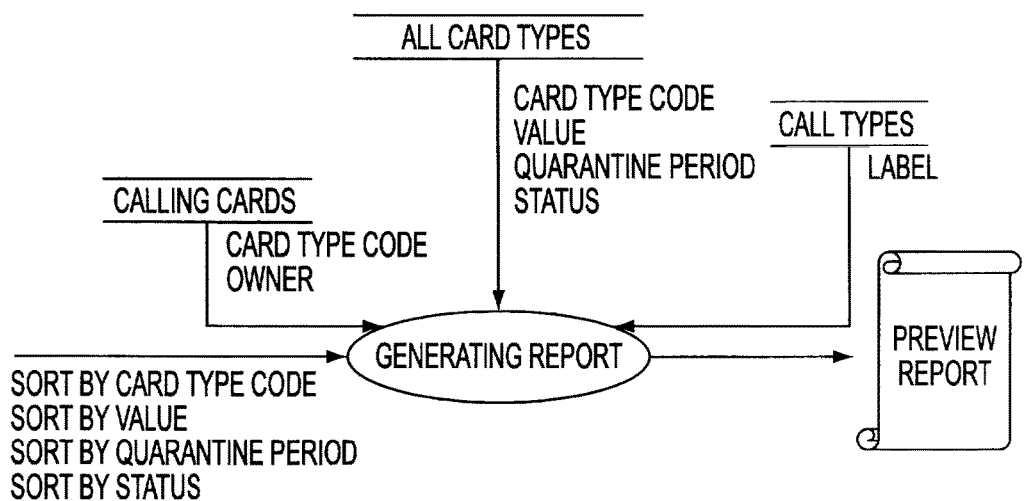
Figure 7A:
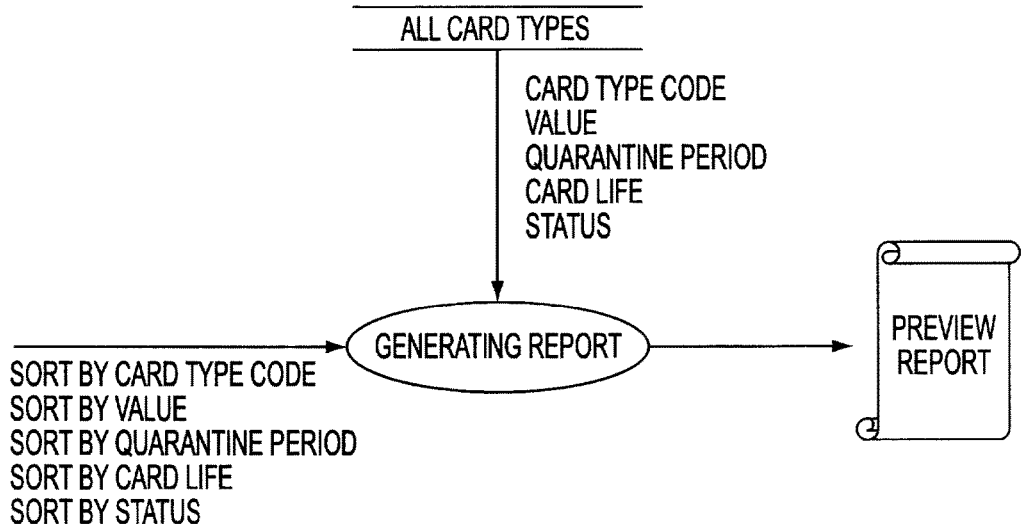
FIGS. 7A and 7B are flow charts of the creation of top-up card reports.
Figure 7B:
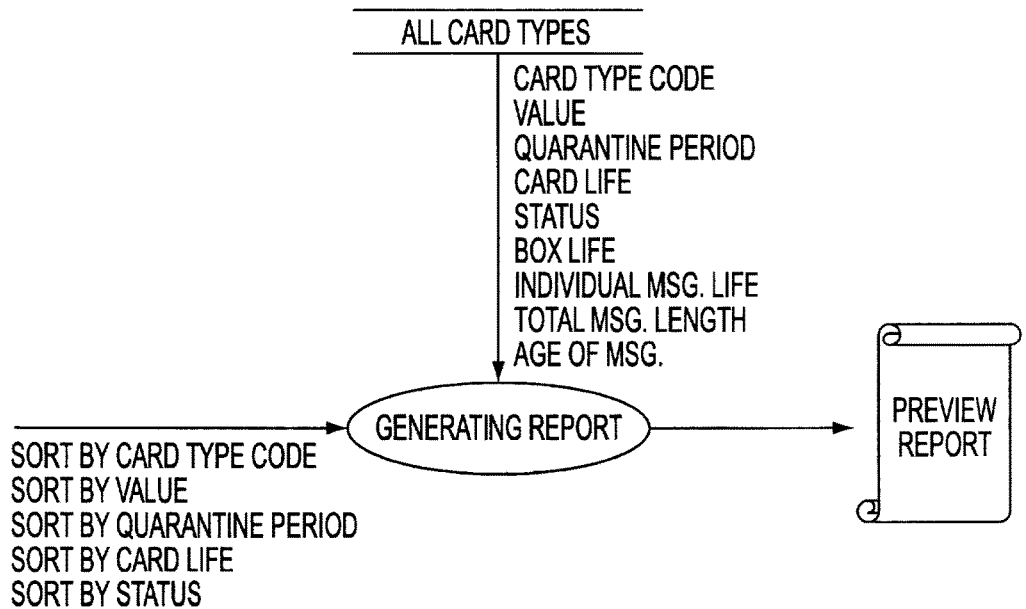

FIG. 4 sets forth the process used to create a PIN access card by utilizing the Card Manager™ subsystem in accordance with a preferred embodiment of the present invention. The process begins when an authorized user requests a specific number of one or more of the three types of PIN access cards supported by the system: top-up cards, calling cards, and voice mail cards. The actual card type and detail definition is shown in FIG. 5. Any number of lots of cards may be created. The type, denomination, card life, and quarantine period for each card is entered or selected from a given list by an authorized user. The desired number, type, and denomination of PIN access cards are created, with appropriate instructions and access numbers printed on the cards. An external reference number may also be printed on the card for use by a system provider should the customer 1 forget or lose the associated PIN number. In addition to the above information, each voice mail card has a profile ID. Corresponding unique PIN numbers are assigned to each card, based on issued PIN numbers previously stored in databases 33, with the new PIN numbers being added to those already in the database 33. A report matching each PIN to an access card is generated, since the PIN numbers are not printed on the access cards for security purposes. FIGS. 6A, 6B, 7A, and 7B detail the information and functionality of reports that can be generated corresponding to each type of PIN access card produced by the system. Additionally, the card production reports may list the number of lots in a particular batch, the number of cards in a particular lot, the total number of cards printed, and the value of each lot and batch printed.

The Card Manager™ subsystem controls the distribution and usage of the PIN access cards 3 and includes the following subsystems: card management, account management, external carrier and rate plan, sales administration, management information system administration, and batch processes for volume data transfers. The card management subsystem (CMS) is located at the central operations office 71 for centralized control over the distribution and usage of the cards 3. The central operations office 71 provides total control of the card configuration with services such as configurable PIN length, user-definable card type configuration, and voice mail profiles. The CMS assists in achieving a centralized control and distribution mechanism for the definition, printing, physical inventory, and financial value of the PIN access cards 3. The CMS also provides a centralized MIS for monitoring sales performance and inventory control regarding the cards 3 within a single computerized software application.

In addition, the CMS has the following particular services: card types definitions, PIN generation, card print vendor maintenance, card printing orders management, accounts payable for card generation, and the creation and maintenance of home and corporate voice mail accounts under the cards. The account management and administration subsystems integrate work flow into the system of a preferred embodiment of the invention with approvals introduced for all sensitive card, distribution, and account management functions, including inventory control, lost card deactivation, and financial accounting. The account management subsystem contains modules that provide central 71 and regional 59 office users with database control manipulation and decision-making support; an interactive work flow for home and corporate account creation, activation and maintenance; itemized statement creation, tracing, and reporting; user definition; voice mail accounts and profile maintenance; accounts receivable and payments history; and providing information held in system databases such as itemized statements to customers on demand for customer service or other inquiries.

Figure 8:
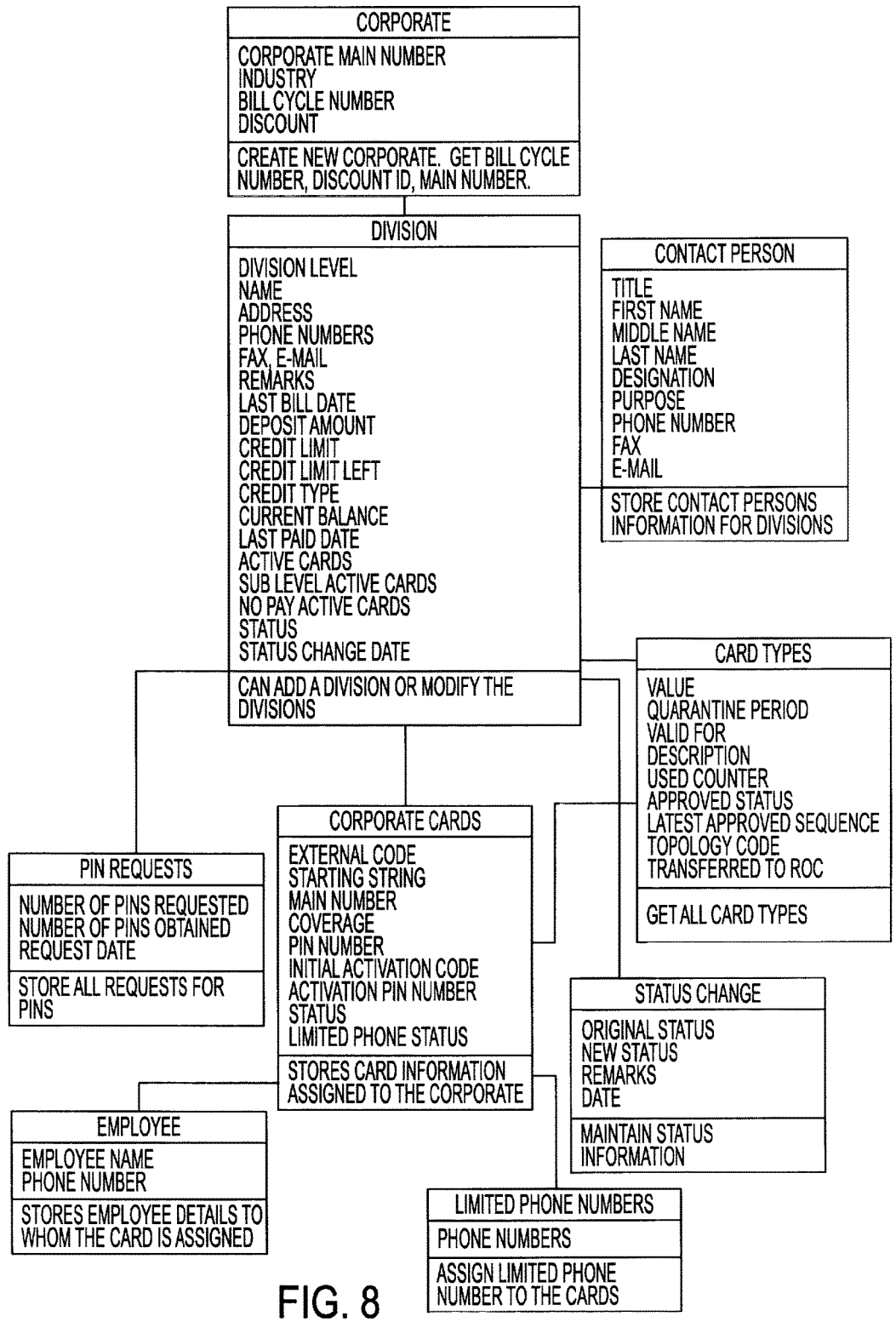
FIG. 8 is a block diagram of the operation of the corporate management subsystem that manages card account information and transactions.
Figure 9:
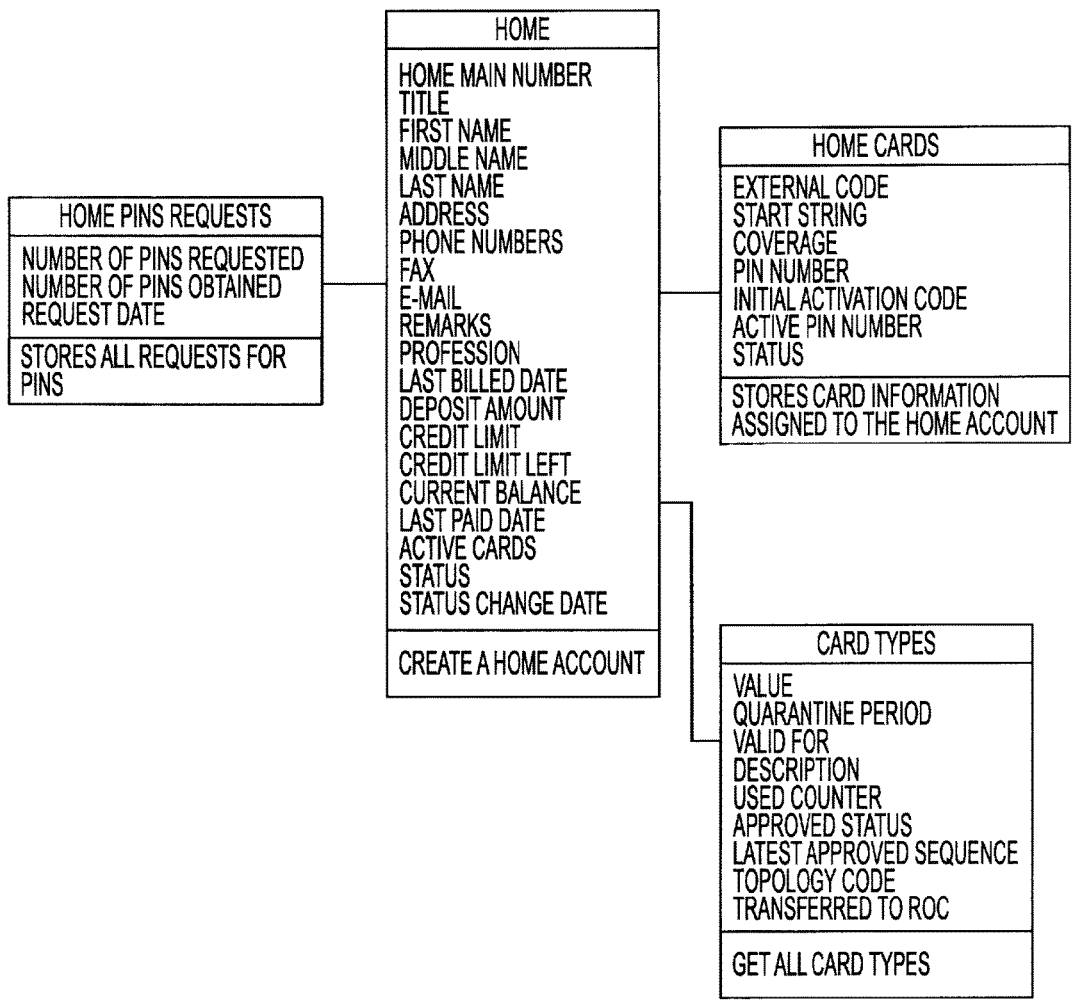
FIG. 9 is a block diagram of the creation and maintenance of home accounts and home cards.
Figure 10:
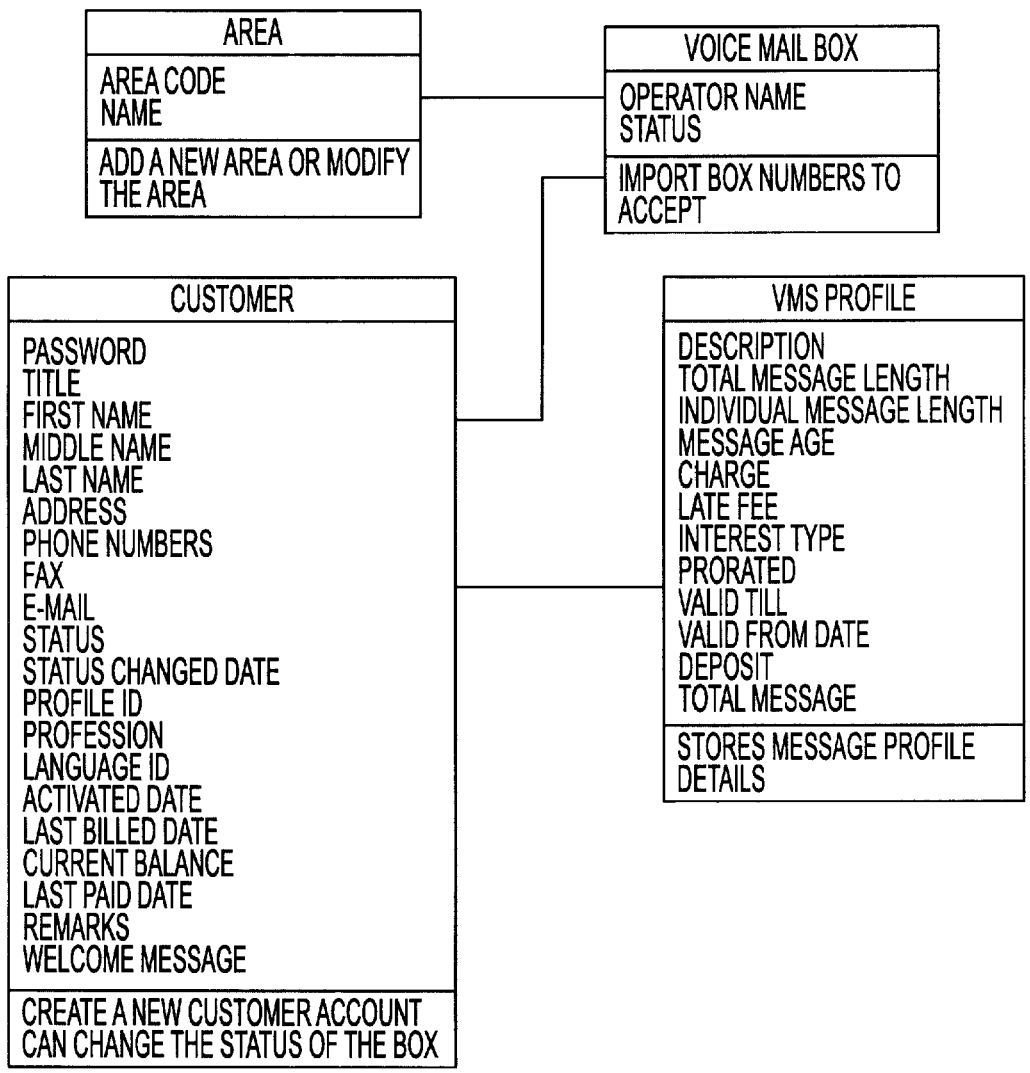
FIG. 10 is a data structure diagram of the virtual telephony system.

Under controlled circumstances, corporate and home customers may submit detailed orders for PIN access cards, as shown in FIGS. 8-10. The account management subsystem is comprised of a corporate account management subsystem as shown in FIG. 8, a home account management subsystem as shown in FIG. 9, and a management subsystem for virtual telephony (voice mail) for corporate and home account users as shown in FIG. 10. The corporate management subsystem provides internal users the ability to create corporate accounts, change card status, request PIN's, and issue cards 3, as well as data entry and storage, as shown in FIG. 8. Referring now to FIG. 9, functionality provided by the home management subsystem includes the ability to create home accounts, change card status, request PIN's, and issue cards 3. Finally, the functionality provided by virtual telephony as shown in FIG. 10 is to define area information, to import voice mail and voice mail profile box numbers, and to create new customer accounts with customer-specific manipulated settings. A calling card can be owned by an individual, a home sector, or a corporate sector. The voice mail services of the present system in accordance with the preferred embodiments are particularly helpful in places where telephones are not easily available. In such situations, a phone number is allocated to a user but no physical connection is made to a telephone device when a call is received by the phone number. Instead, all calls to the number are routed to a mail box in the users name. Hence, the term, "virtual telephony". The user can call the mail box at any time from any phone and retrieve any messages. Alternatively, the user can notify the system to make a physical connection to a telephone device available to the user for the routing of all telephone calls.

The Switch Manager™ subsystem, which again is the telephony system for providing the out-dialing, call conferencing, and voice mail services of the CallManager™, operates on a Windows NT platform or a Unix platform, and non-proprietary hardware (such as Intelmicroprocessor based servers) with any number of common CTI cards 25 (for example, offered by Dialogic Corporation).

The out-dialing module provides the complete outdialing functionality of the Switch Manager™ in conjunction with related functions of Card Manager™ in accordance with a preferred embodiment of the invention. Upon receiving a pin-based telephone call initiated by a subscriber, the Switch Manager™ responds by transmitting a greeting to the customer 1, requesting entry of a PIN number, and upon receipt of the PIN number, transmits data to the Card Manager™ for requesting the authentication of card 3. The Card Manager™ subsystem verifies from the account manager database information from database 33 that the account is active. The Card Manager™ advises the Switch Manager™ whether the account is valid. If the verification fails, the Card Manager™ so communicates to the Switch Manager™, which transmits a corresponding message to the customer 1 advising of the verification failure and requesting the customer 1 to retransmit the PIN and/or account number. After several, such as three, failures, the Switch Manager™ will terminate the call with an appropriate message transmitted to the customer 1. If the PIN verification is successful, the Card Manager™ retrieves the remaining account balance from the account manager database and transmits the balance information to the Switch Manager™. The Switch Manager™ transmits the balance information to the customer and requests and accepts the out-dialed number for completion of communication links over the PSTN 11; validates the outdialed number for allowed call type on the card 3 by comparing the number to the allowed numbers list in the Card Manager™ subsystem; and performs the outdialing and call progress analysis. The Switch Manager™ includes a facility for making multiple calls after account and PIN authentication. At the end of a call, the Switch Manager™ reestablishes connection with the customer 1, advises the customer the balance remaining in the account, and presents to the customer 1 the option of making another call, hanging up, or initiating another Switch Manager™ service 27. The customer 1 may initiate additional out-calls as long as sufficient balance remains in the account. Similarly, the customer 1 may initiate call conferencing or voice mail functions as discussed below. Should the customer hang up or terminate the call through the menu options presented by the Switch Manager™, the Switch Manager™ will communicate the remaining balance to the Card Manager™, whose account management subsystem updates the customers account information in the database 33.

Figure 11:
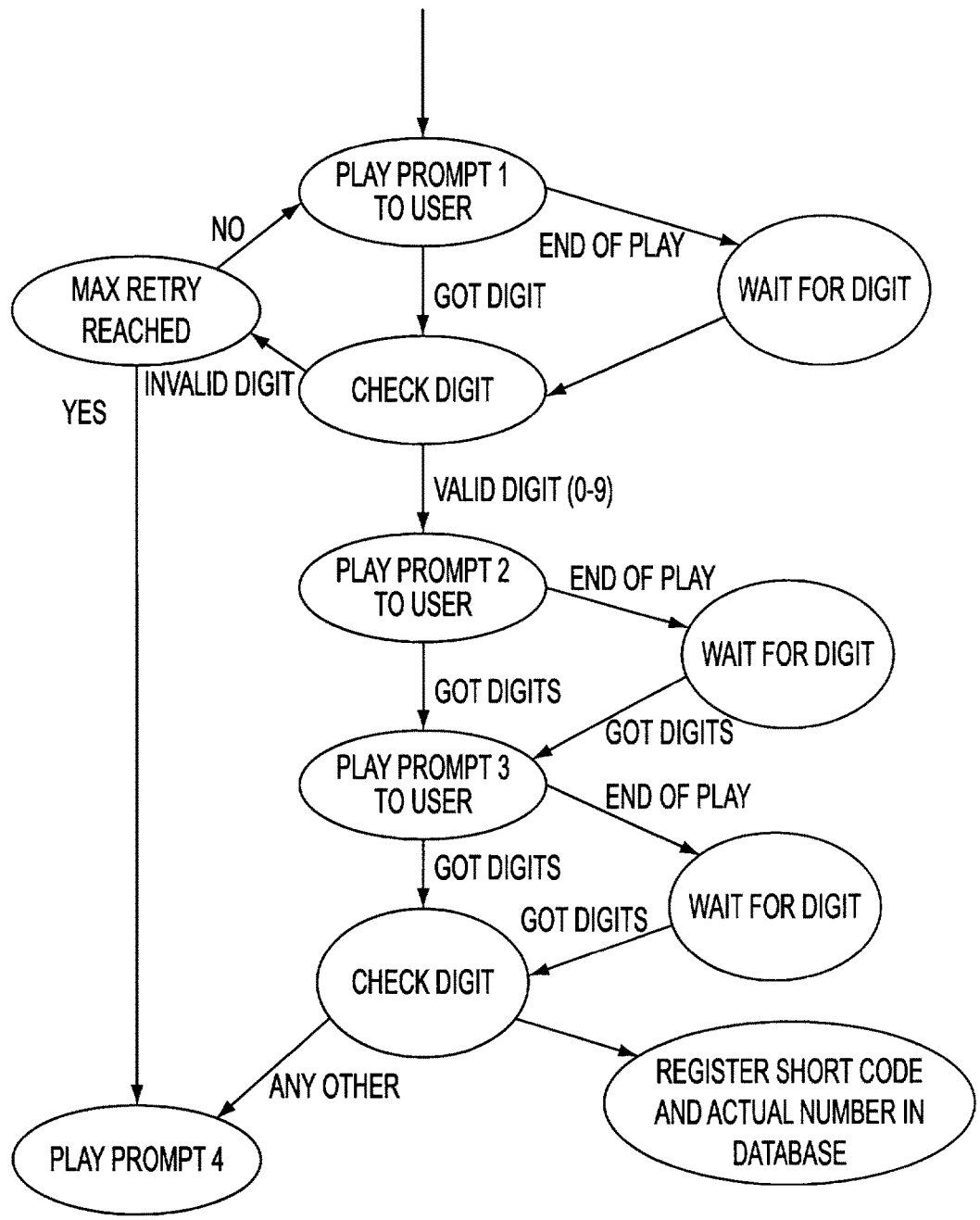
FIG. 11 is a flow chart of registration of an abbreviated dialing service.
Figure 12:
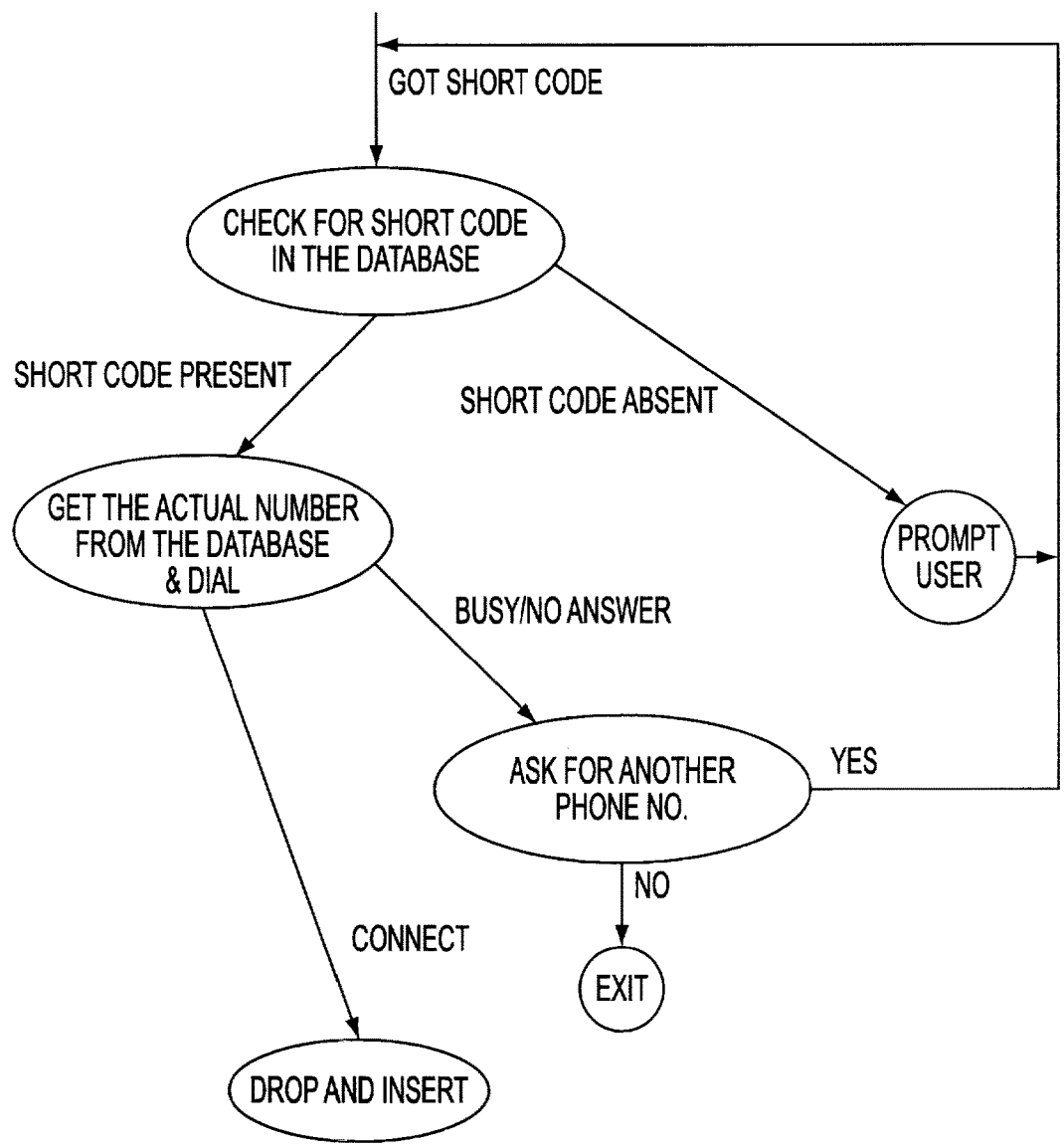
FIG. 12 is a flow chart of operation of the abbreviated dialing service.

The Switch Manager™ also monitors PIN usage and will terminate simultaneous account/PIN use to reduce and prevent fraud. The Switch Manager™ provides support for multiple languages to facilitate operation of advanced telephone services over analog connections; transmits a warning beep that notifies users prior to call cut-off, for example due to an exhausted account balance. It also provides automatic call routing to call centers upon predetermined events as defined in the card and user administration settings stored in the central and/or regional database 33/68. As detailed in FIGS. 11 and 12, the calling subscriber for dialing out can use abbreviated numbers based on information previously loaded by the customer 1 in database 33.

The call conferencing subsystem of the Switch Manager™ provides multi-party call conferencing functionality to the PIN card subscriber 1. The subsystem provides users with an interactive voice response or operator-assisted method of joining multiple connected calls into the conversation and to debit the customers PIN access card's corresponding account balance for the charge of initiating a conference call and for the charges accruing during the call. The caller-initiated conference is supported by the system by holding calls open and active as the parties to the conference call are contacted by the system and brought into the call. As with outdialing, the call conferencing subsystem requires prior authentication of account and PIN number before establishing the conference call.

Figure 13:
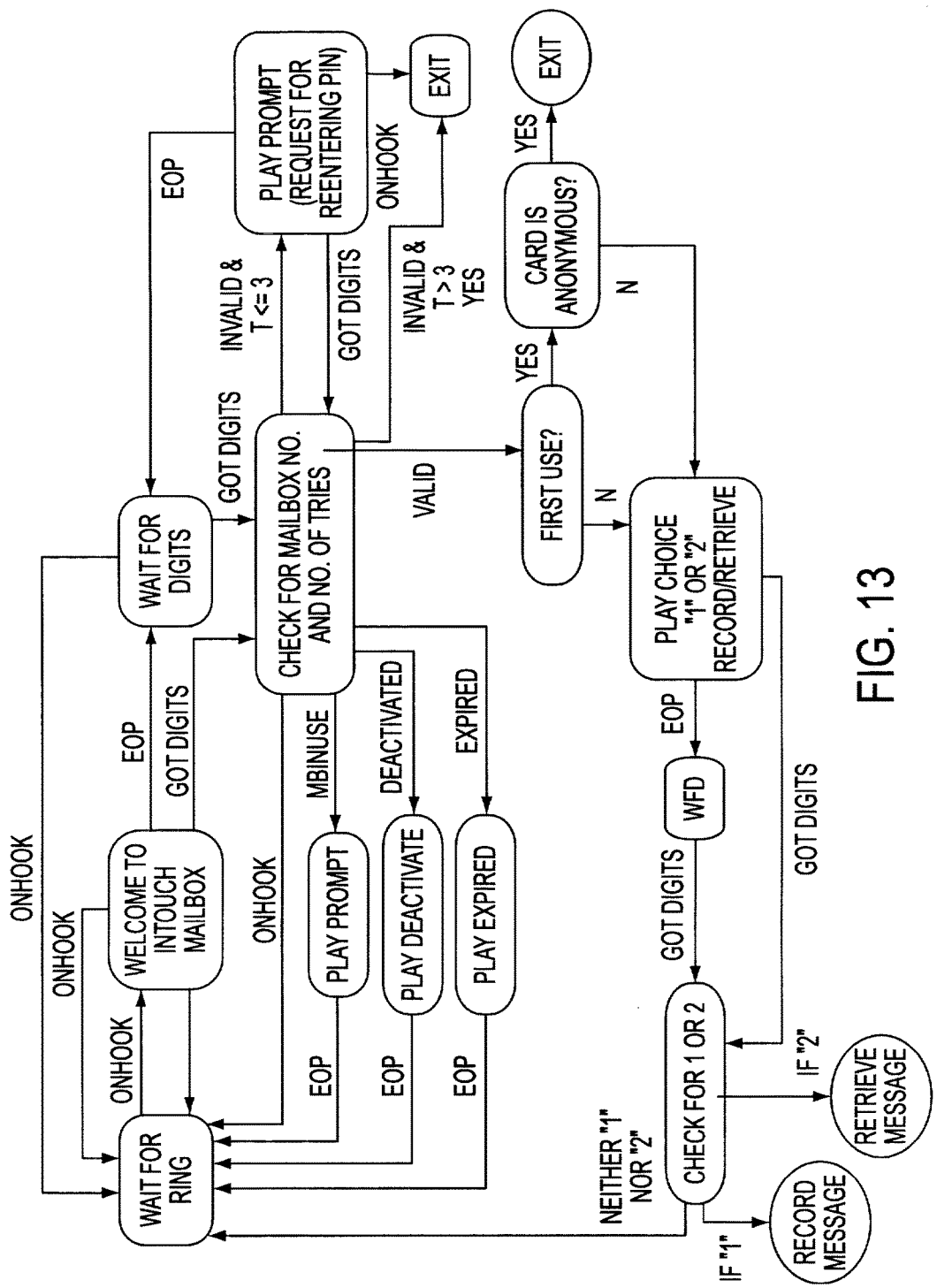
FIGS. 13-15 are flow charts of operation of the voice mail system.
Figure 14:
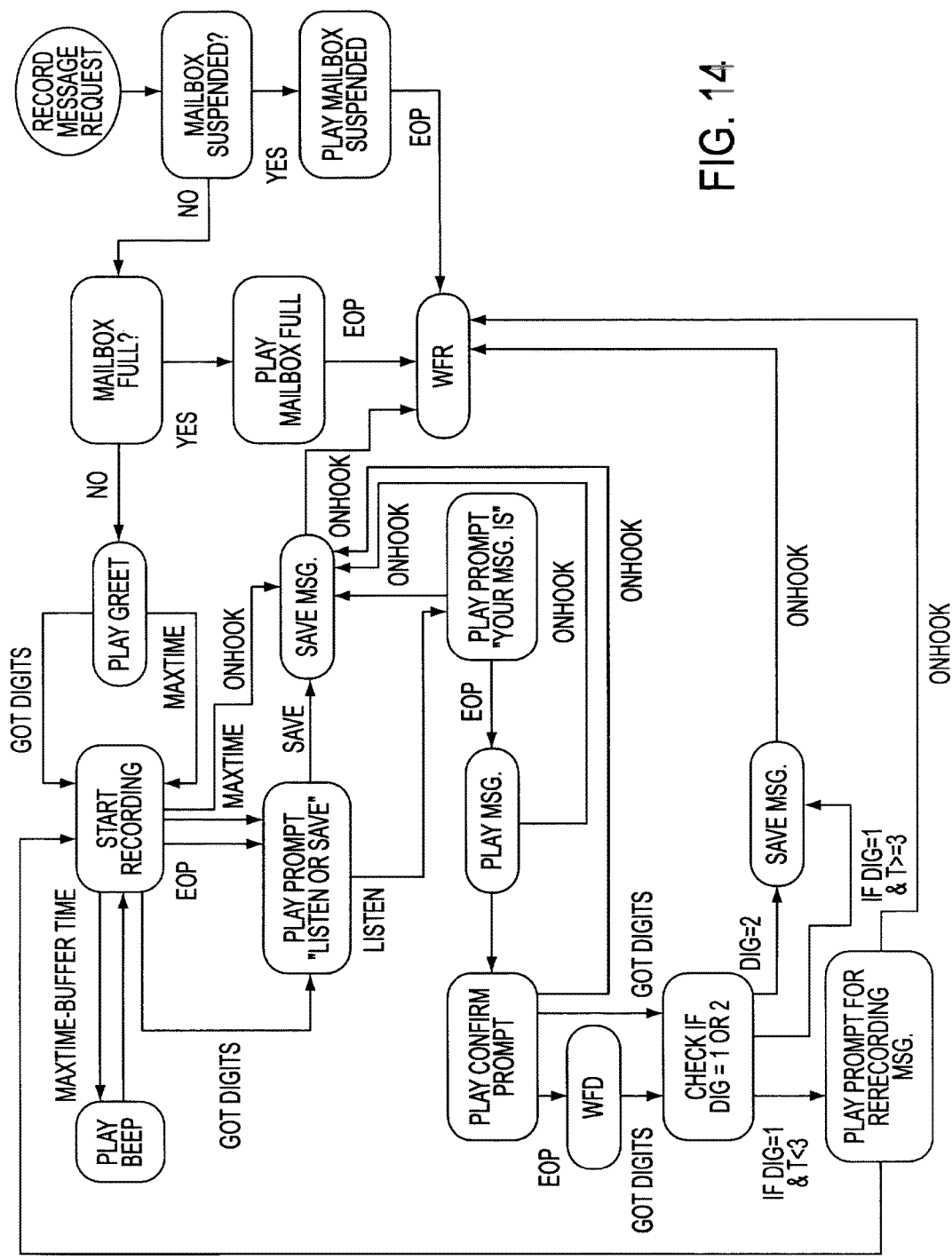
Figure 15:
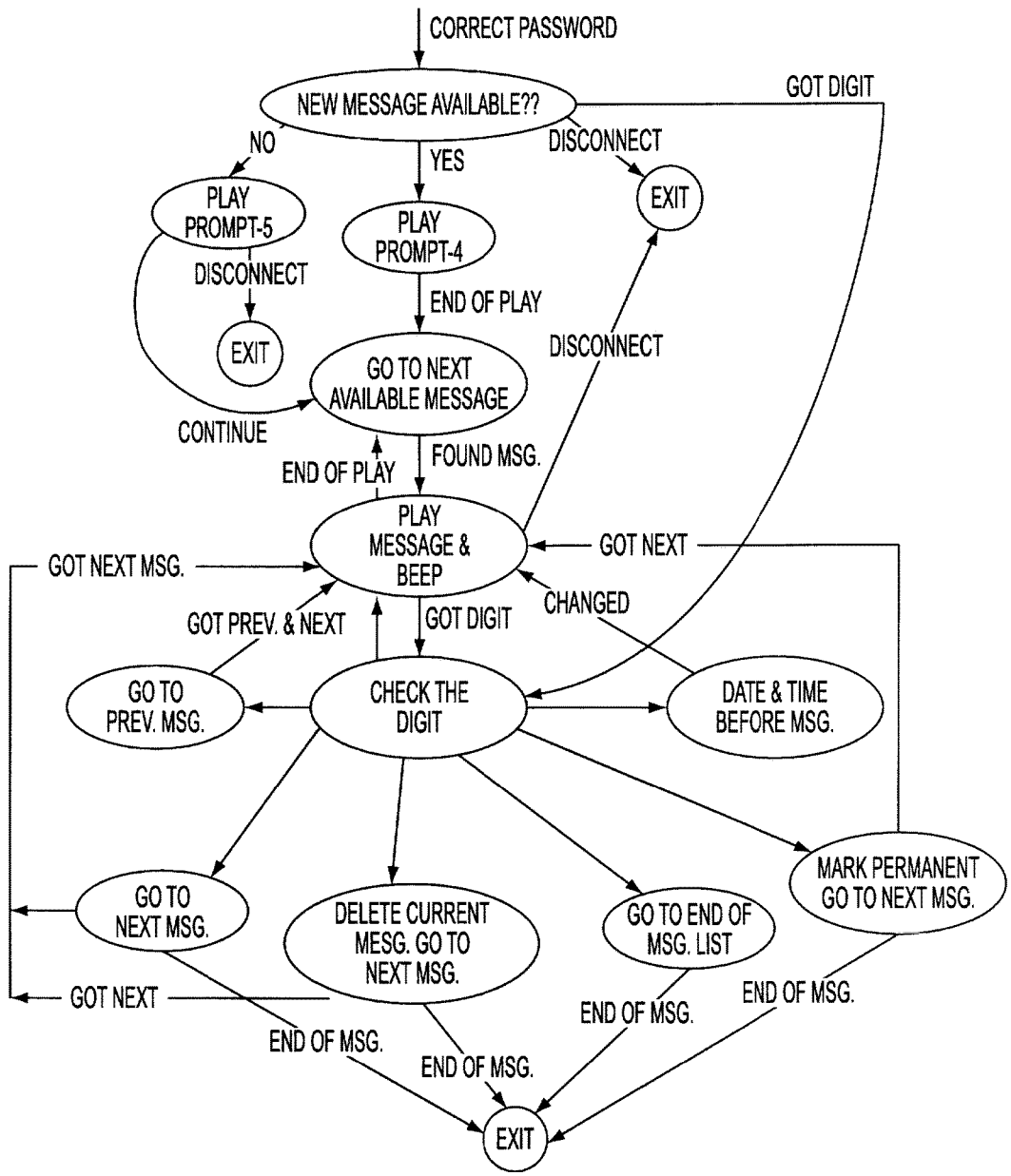

The voice mail subsystem of the Switch Manager™, as detailed in FIGS. 13-15, provides voice mail functionality to PIN-based customers 1. Referring now to FIG. 13, a user of the system sets up and accesses a voice mail box with the interactive voice response subsystem of the Switch Manager™. The user has the option of setting up multiple mail boxes within a primary account and may provide various greetings/messages within the various mail boxes and under various in-call circumstances, such as no answer or line busy. These mail boxes and messages are stored in the database 33 of server 23. Referring now to FIG. 14, when a call routed through the system encounters a voice mail subsystem condition (such as no answer or line busy) and the number called has a voice mail box set up on the system, the Switch Manager™ directs the appropriate greeting to the caller and stores any response for later retrieval by the mail box owner (see FIG. 15). The system provides password-access administration of the voice mail boxes. Stored messages may be navigated and retrieved by the storage date. The customers account/card is charged or decremented for the voice mail box setup and usage.

If the PIN access card being utilized to initiate and pay for the above Switch Manager™ services is a top-up card, then the communications to the user regarding account balance, insufficient balance, or exhausted balance include an option for the user to add a value to, or "top-up", the card. Under such circumstances, the user provides a bank account or credit card account number from which the system will, in real time, transfer funds into the users telephony account.

The customer management subsystem of the account management subsystem accepts customer information from the user for opening a voice mail box account and establishing a mail box profile. The user enters the name, address information, and voice mail box profiles into the system, which define the deposit amount, maximum voice message length, maximum number of messages, maximum age of retained messages, and voice mail box life. The system also assigns the area code and voice mail box number to the account. This account status can be changed to active, suspended, or deactivated. By clicking the "query" button, the user can search the profiles which exist in the system.

The ability to assign cards 3 to other customers is a service of the account management subsystem of the Card Manager™. Upon the request of a customer 1 to assign cards 3, the total credit amount and remaining credit amount for each card 3 and account assigned to that customer is displayed to the user. Depending on the customers request, specific cards 3 may be assigned to a designated corporate or home account. In the alternative, the user may enter a dollar amount of cards to be assigned, and the system will determine which cards 3 should be assigned to meet the requested credit value. Authorized corporate and home customers may effect this assignment directly, without submitting a request to a central 71 or regional 59 office.

Figure 16:
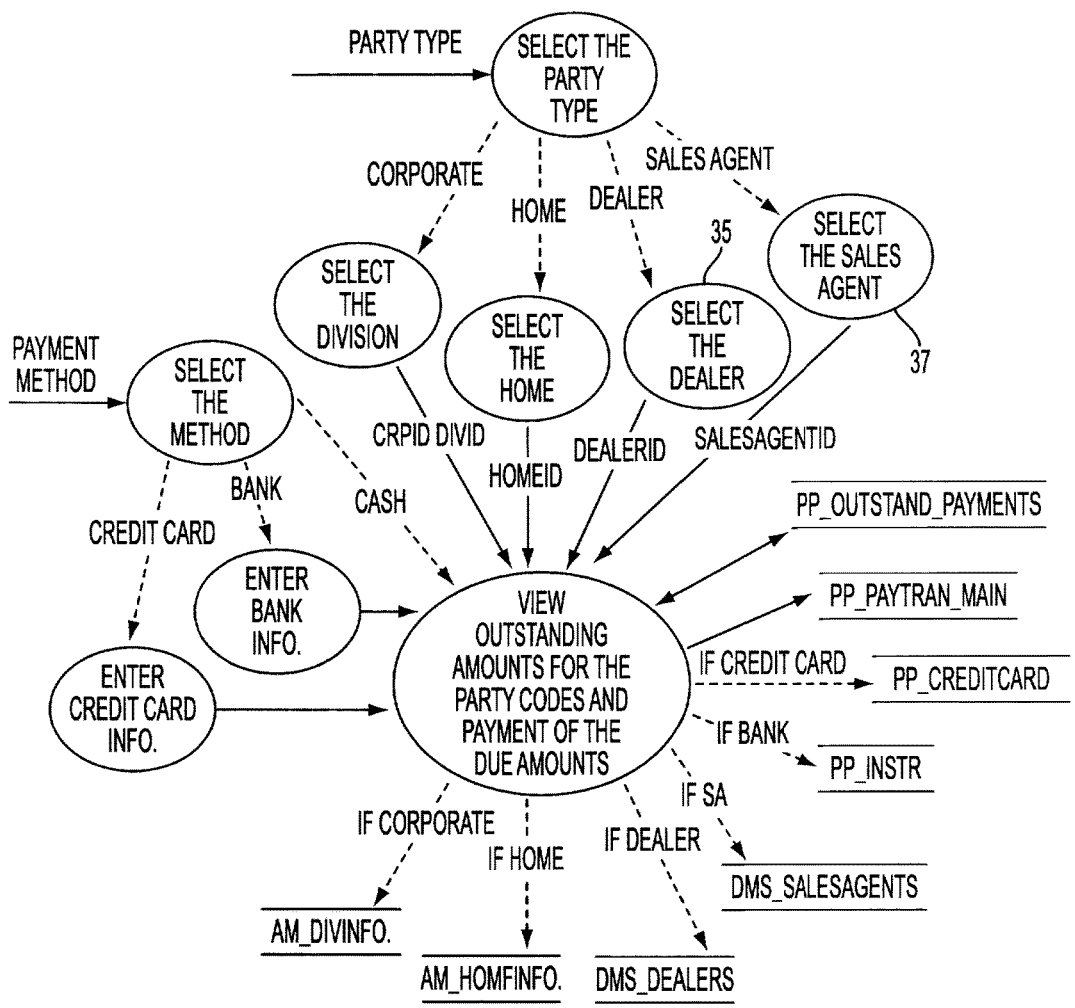
FIGS. 16-17 are flow charts of the payment maintenance for receivables, account balance, and credits.
Figure 17:
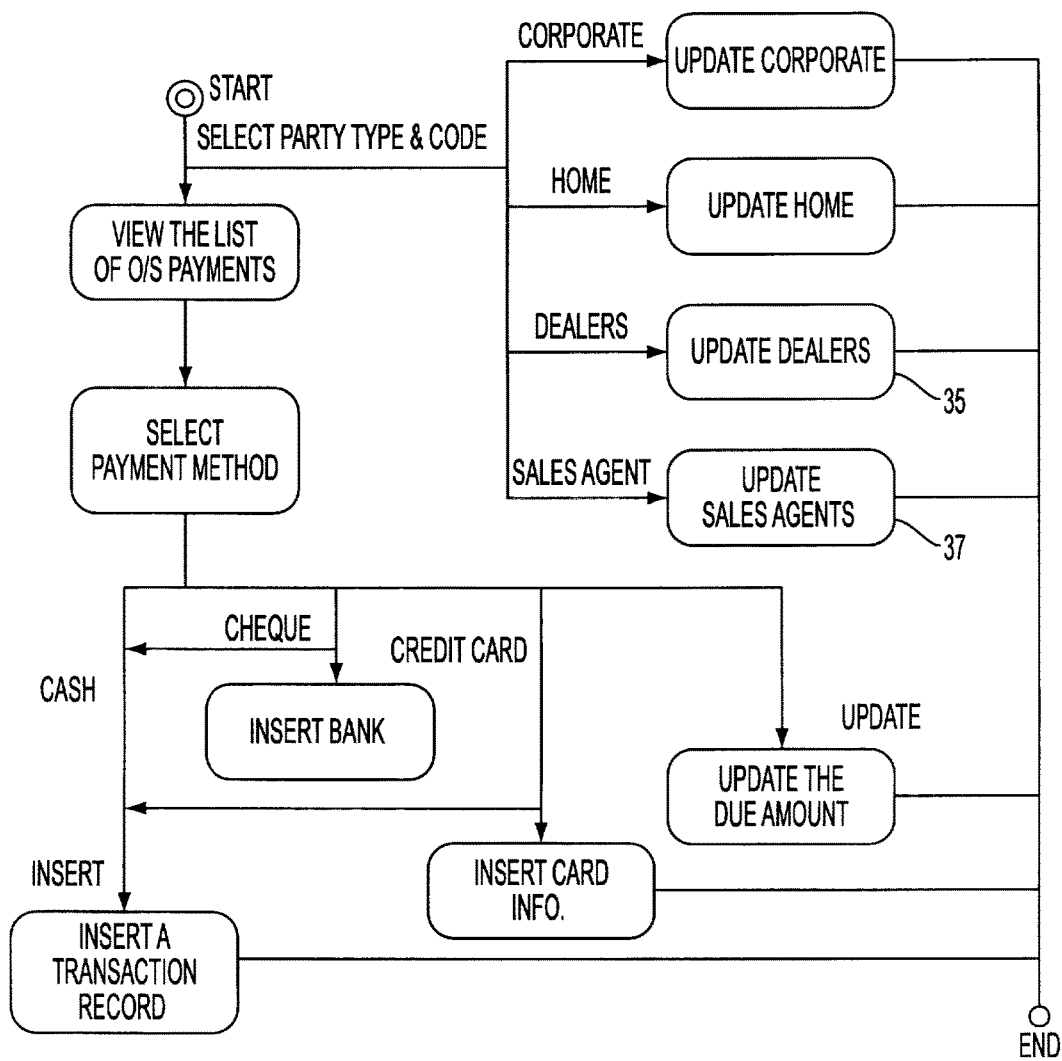

Referring now to FIGS. 16 and 17, the payments option of the account management subsystem allows the user to accept payments for a selected account. At the offset, the user selects the transaction to be processed, whether receiving a payment from a corporate or home account or receiving a sales receipt from a dealer 35 or sales agent 37. The user then enters the details of the current transaction, such as payment method (credit card, bank instrument, cash, etc.), payment amount, payment date, etc. After entering the details of the payment, the user has the option of accepting the transaction details or canceling them and starting with another transaction. If accepted, the payment is booked or the receipt is logged, and the results are stored in the database 33.

Call center agents 70 have the ability through remote terminals to search the databases 31, 33, and 68 for customers by account, account type, name, services, address, voice mail box number, etc. For example, a call center agent 70 may select an account type from a drop down menu list and view calling history, profiles, payments, and other details for all qualifying accounts. By selecting the account type, details of the account such as name, address, deposit, credit limit, and call history, etc. are displayed to the user. The user can also select by corporate division or home name to display all accounts and cards assigned to the division or home. The payment details are displayed, and the payment history of the current account can also be viewed. Details of the payment mode can be viewed by selecting the column "Payment Method". On selecting the "Accept Payments" button, a screen is displayed through which the payment details are accepted and posted to the database 33. The home search facility displays all home account numbers and home names according to a selected search criteria, which is yet another provision of the account management subsystem of the Card Manager™. Sorting can be done by clicking the column headings of the home list. Once a home account is selected, it can be viewed or manipulated by authorized users of the system.

The ability to maintain corporate and home accounts is another service of the account management subsystem of the Card Manager™. Through either a corporate or home maintenance subsystem, users can view, add, and modify the details of any level of a corporate or home hierarchical structure and contact persons as stored in the database 33. Some of the details of the corporate account are business type, bill cycle, multiple addresses (present address, previous address, billing address, etc.), customer ID, financial soundness, discounts, contact persons, contracts and contract terms, and responsibility for payment. The home customer details displayed include default address, billing address, account ID, status of account, billing cycle, discounts, customer identity, financial soundness, payment information, detail of card types and denomination, and contracts.

Each corporate customer has a stored hierarchical structure reflecting the multi-level structure of the corporation. All details of the corporate customer can be displayed, including address information, payment information, card details, and summary. A level can be added to the hierarchy by clicking on the "add level" button, and placing the cursor on the tree displayed. The status of the corporate customer of any level can be changed by clicking on the "change status" button. A request for cards can be placed by depressing the "request cards" button. The details of the cards assigned to the corporate level can be viewed by clicking on the tab named "card details." The details of the current level (level on which the cursor is placed) are also displayed in the grid. The name of the main corporate and the main account number allocated to that corporate customer are also displayed to the user.

On the corporate status screen, any level of a corporate hierarchy's status can be changed. The different status applicable for corporate customers are prospective, active, suspended, and deactivated. If a level in the corporate hierarchy is being deactivated or suspended, the underlying levels of that corporate parent will have the same status as its related parent, provided that level is not responsible for payment. When a level in the corporate hierarchy is being activated from a deactivated or suspended state, the status of the underlying levels of that parent will be restored to previous (original) status. If the main corporate account is activated for the first time, a request will be placed for generating a main account number. Detailed, multi-level corporation hierarchies are used by the system and its users to determine corporate divisional accounts.

Figure 18:
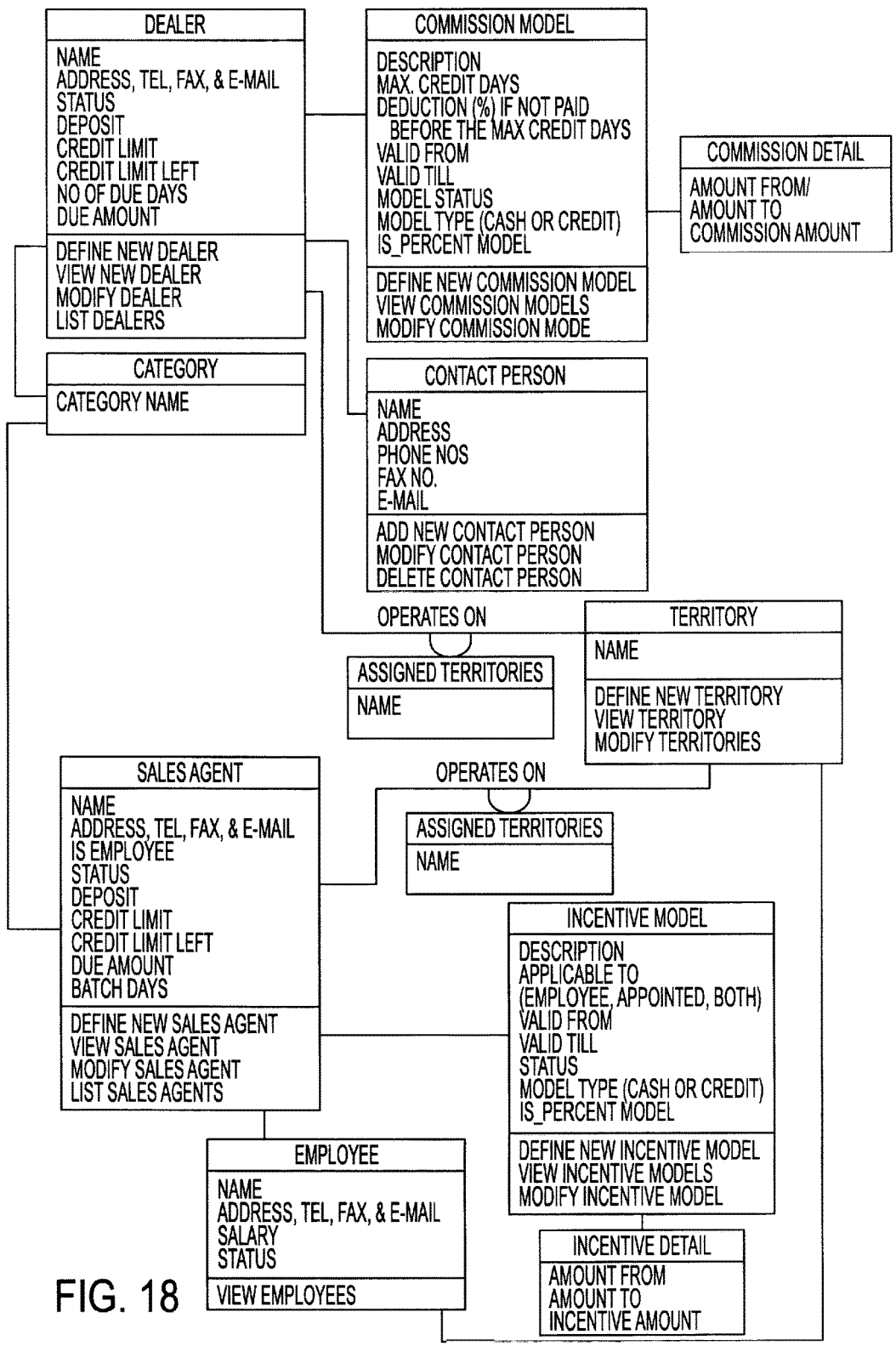
FIG. 18 is a data structure diagram for the dealer management subsystem.

The sales administration subsystem (SAS) subsystem of the Card Manager™ subsystem manages all functions associated with the sale and distribution of the PIN access cards through dealers in distributorships 35 and sales agents 37. This subsystem includes the dealer management subsystem, and elements of this subsystem include dealers maintenance; sales agents maintenance; sales territories maintenance; commission models maintenance; incentive models maintenance; PIN access card 3 issuance to sales agents 37; registration of sold/returned/lost cards 3; commissions calculation; incentives calculation; and accounts receivable management. Through this subsystem, new dealers and sales agents 37 are enrolled into the system, as are new commission models, new incentive models, and updated dealer territories. Referring now to FIG. 18, each dealers name and full address are mandatory, and dealer telephone number, facsimile number, e-mail address, and contact person may also be entered. Information to be entered for each new sales agent 37 includes name, address, telephone number, and title. The commission models are used by the system in determining payment and account balances during sales account reconciliation. Incentive model information may be entered for particular sales agents 37 and will normally include start and end dates of the incentive program, eligible persons for claiming benefits under the incentive program, and the requirements of the program. The incentive models are used to compute check-in/check-out account balances and dealer/sales agent compensation. By registration of sold cards 3, the SAS subsystem, in conjunction with the card management subsystem, loads customer account information into the database 33.

Figure 19:
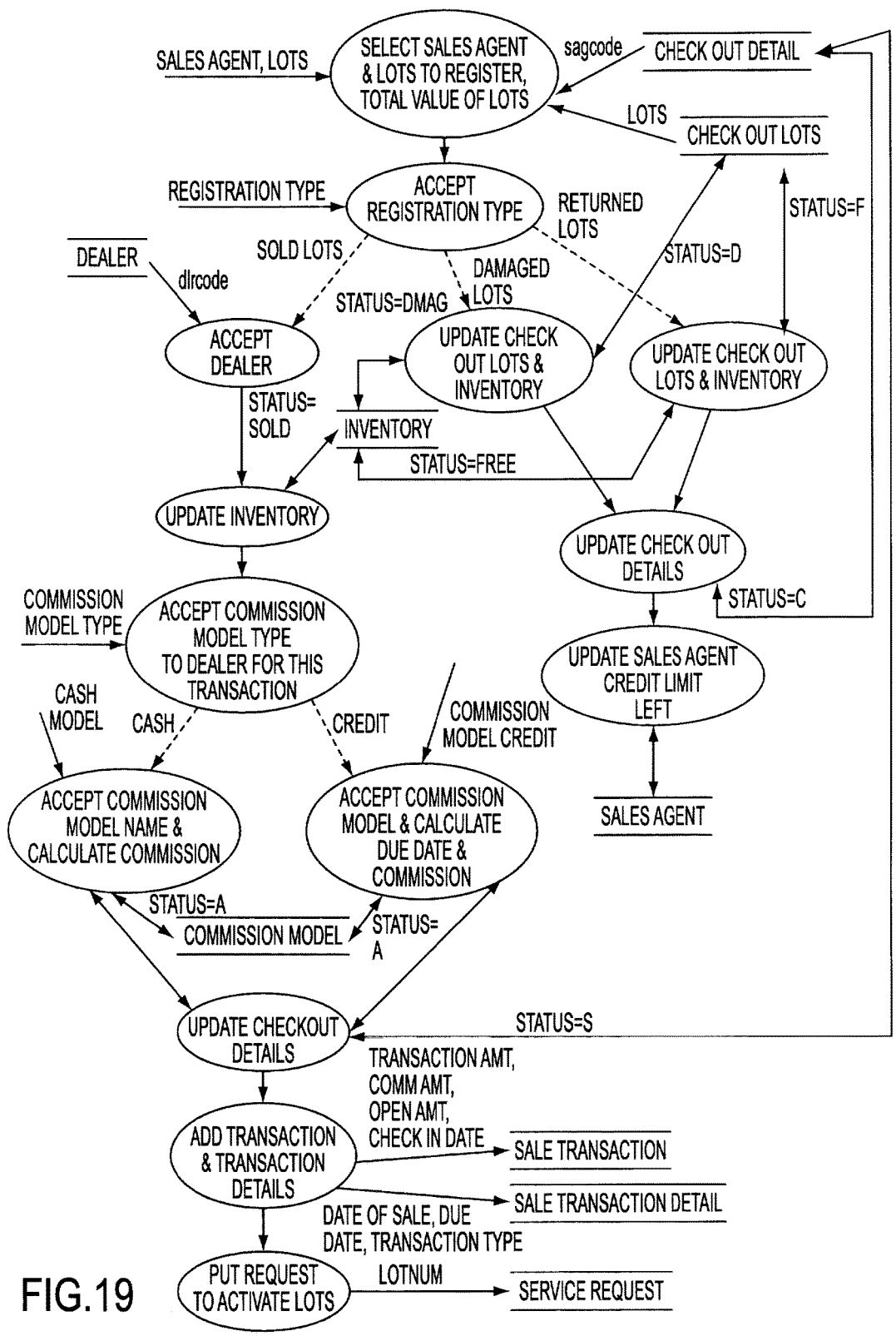
FIG. 19 is a flow chart of sales agent check-in to the dealer management subsystem.
Figure 20:
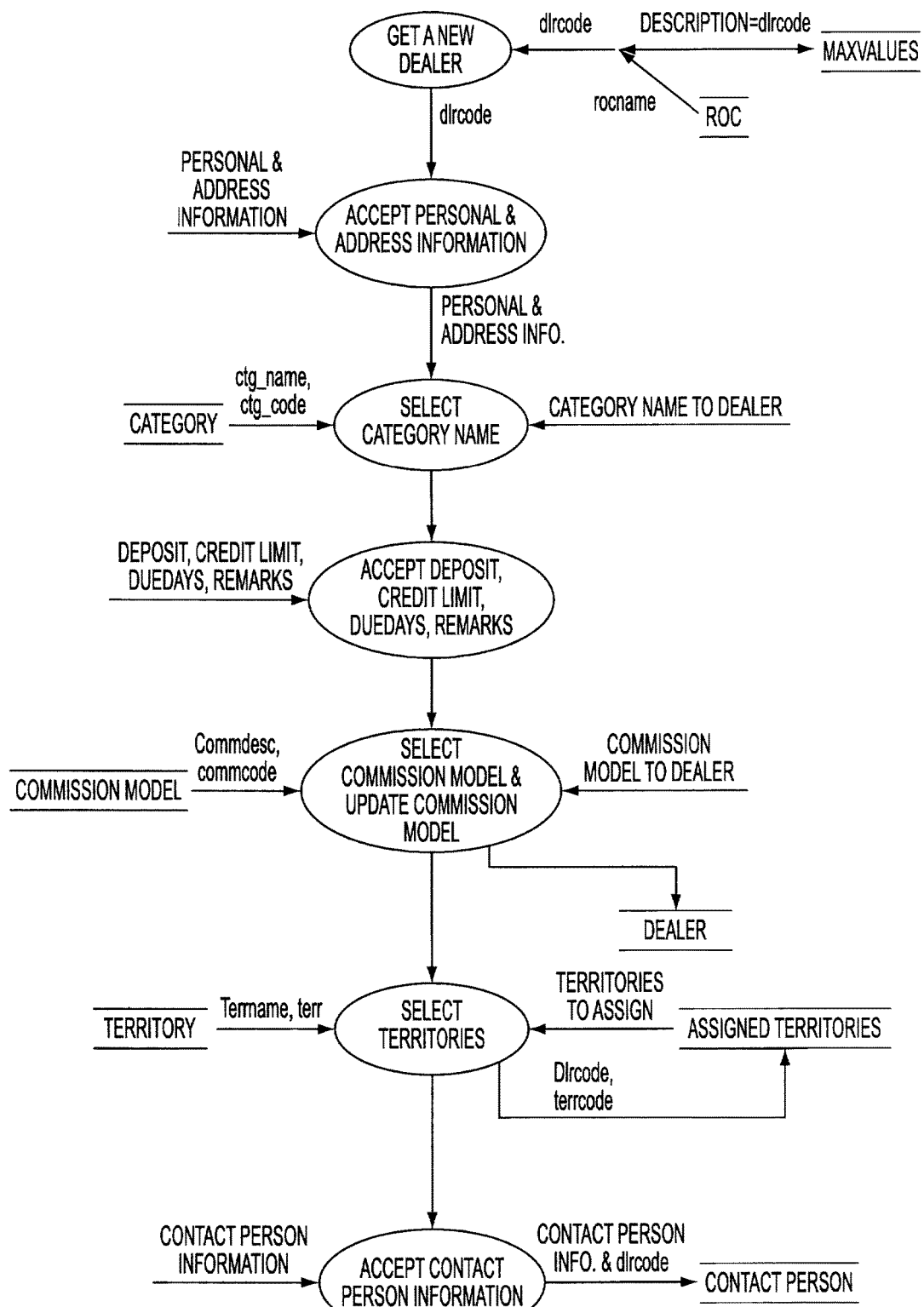
FIG. 20 is a flow chart of adding a new dealer to the dealer management subsystem.
Figure 21:
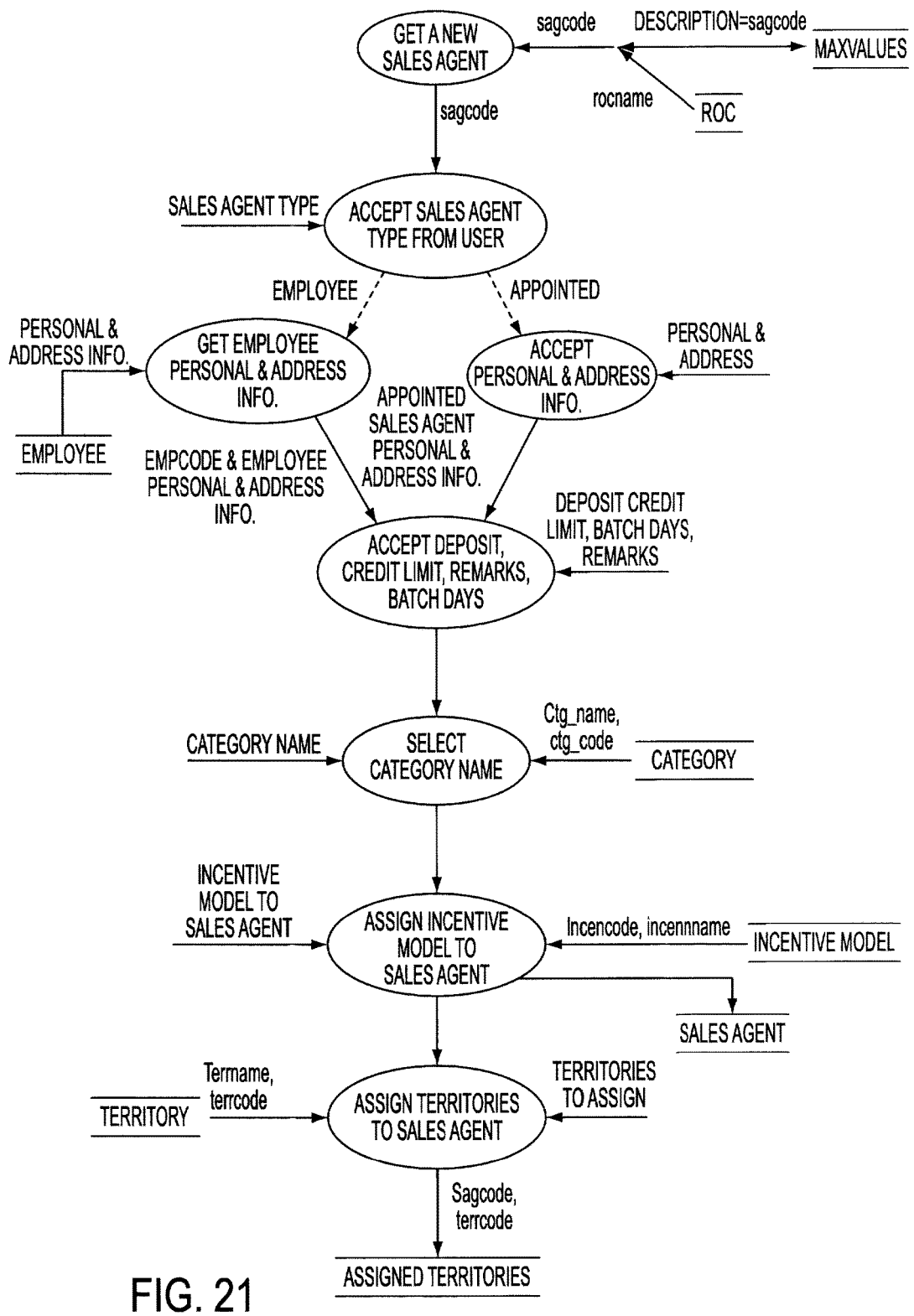
FIG. 21 is a flow chart of adding a new sales agent to the dealer management subsystem.

Referring now to FIG. 19, the data flow associated with the sales agent 37 check-in is detailed. The process shown in FIG. 19 occurs with the return of the sales agent 37 from a sales call or sales trip. The sales agent 37 must account for all cards registered to him/her and must report the cards as having been sold, as being returned, or as having been damaged or destroyed. A card inventory is correspondingly updated, with the returned cards being made available for subsequent sale. The sales agent's appropriate commission model is selected, the number of sold lots is input, and the sales agent 37 is compensated in the form of cash or credit. All data associated with the sales agent's transactions is stored in the server 23 database 33. FIGS. 20 and 21 detail the data flow associated with adding a new dealer and a new sales agent 37, respectively, to the system.

Figure 22:
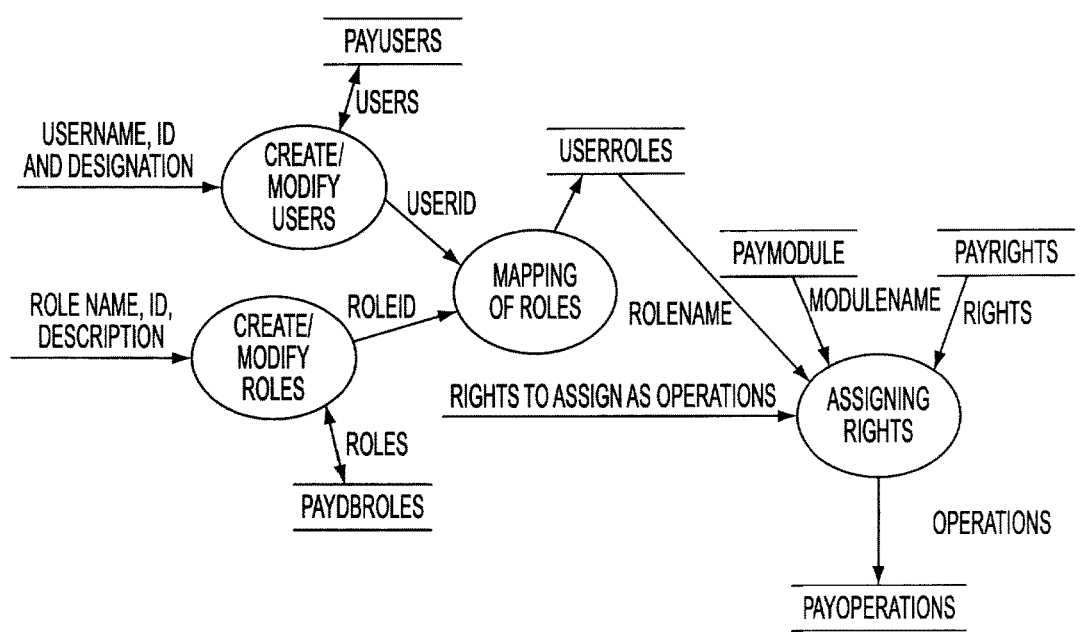
FIG. 22 is a flow chart of the creation and mapping of user roles within the security management subsystem.

The security subsystem of the Card Manager™ provides the ability to assign users to organizational roles, to configure security privileges for different roles, and to regulate work flow through designated, approved roles by utilizing user and operations administrations. The detail of this subsystem is shown in FIG. 22. The user can create and modify users, create and modify roles to access particular subsystems of the system, map operations to roles, map roles to users, and assign the rights allowed on each subsystem to the various roles.

Figure 23:
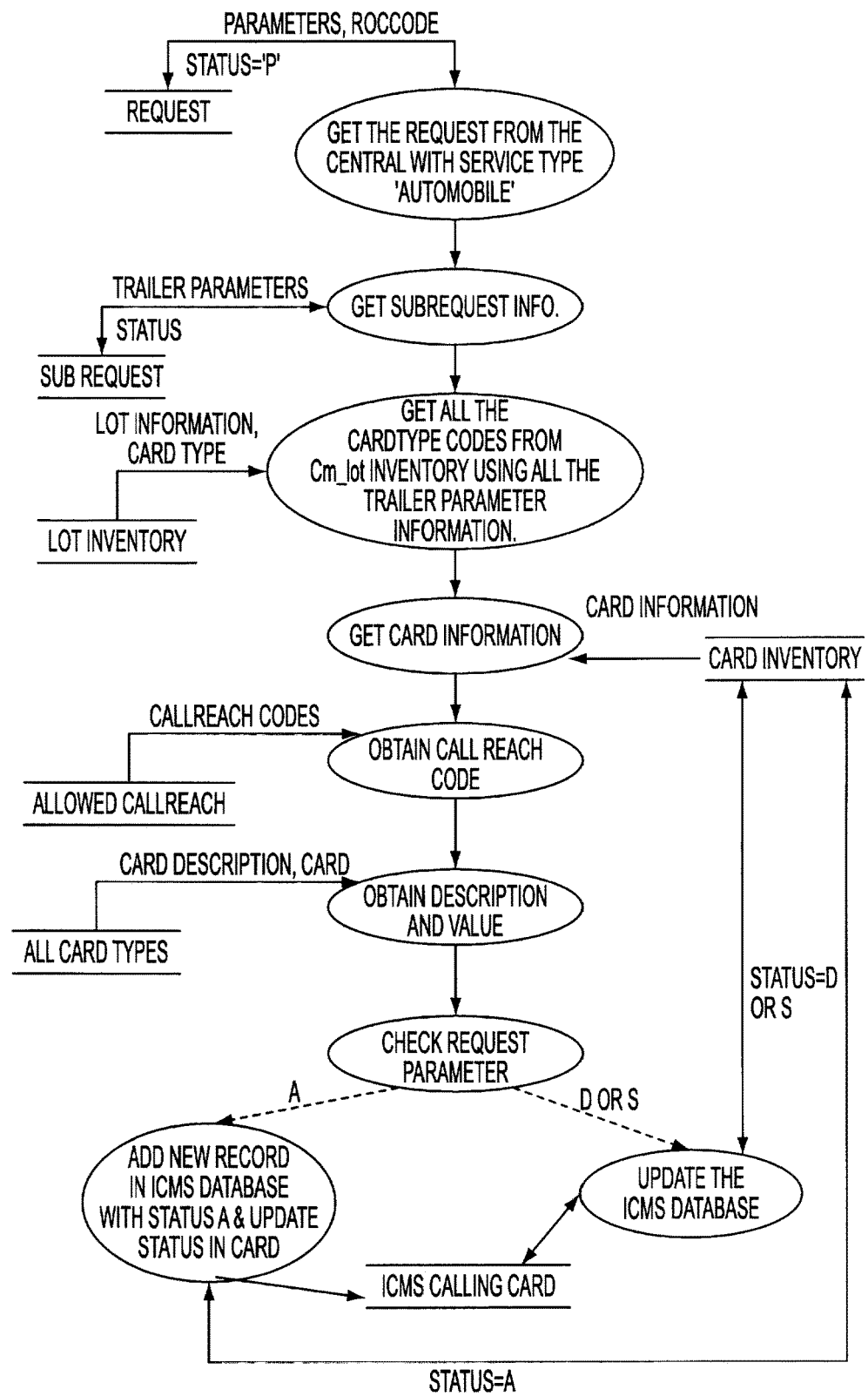
FIG. 23 is a flow chart of authentication of mobile cards.
Figure 24:
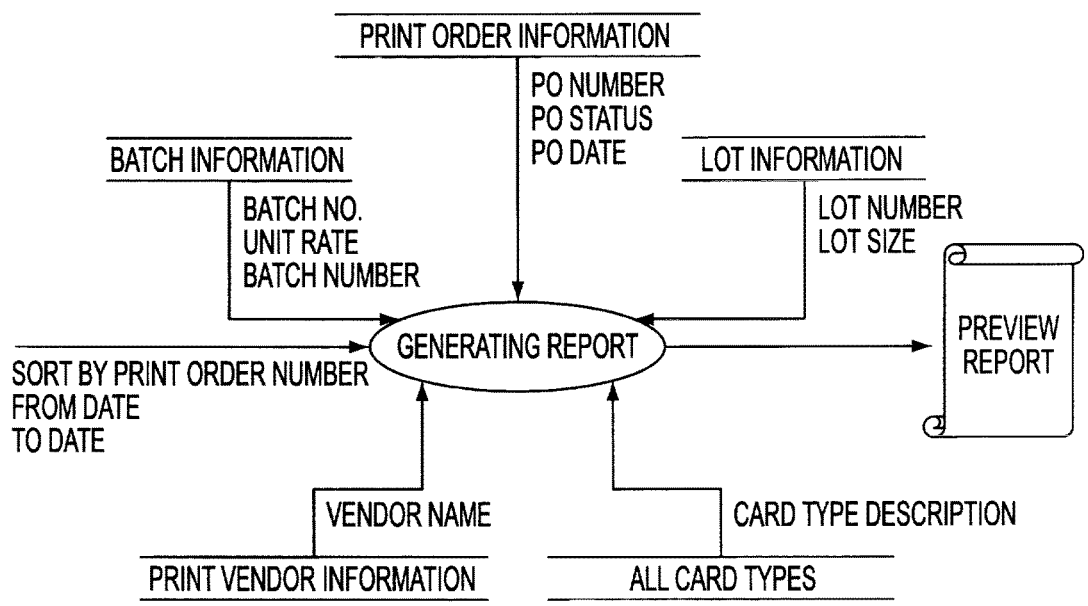
FIG. 24 is a flow chart of generation of a print order status report.
Figure 25A:
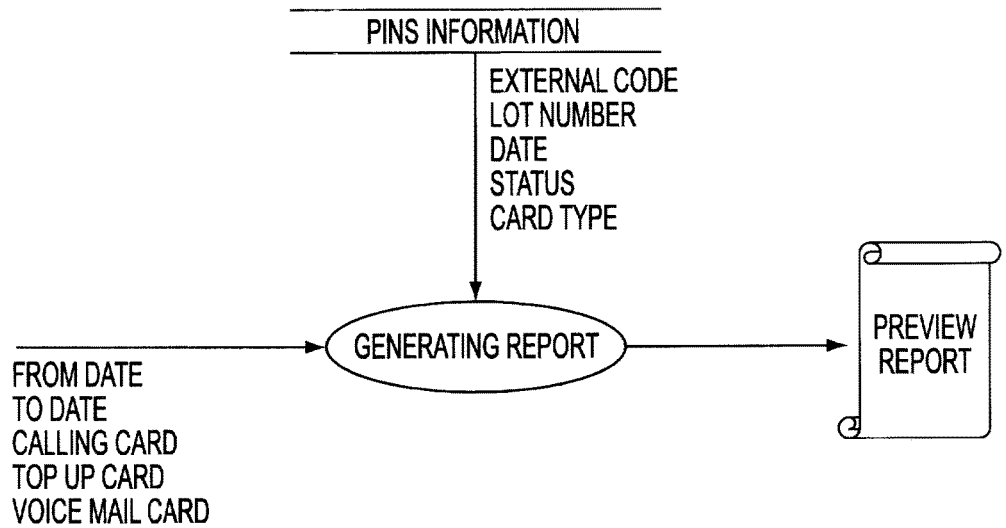
FIGS. 25A and 25B are flow charts of generation of PIN information reports and voice mail system profile reports.
Figure 25B:
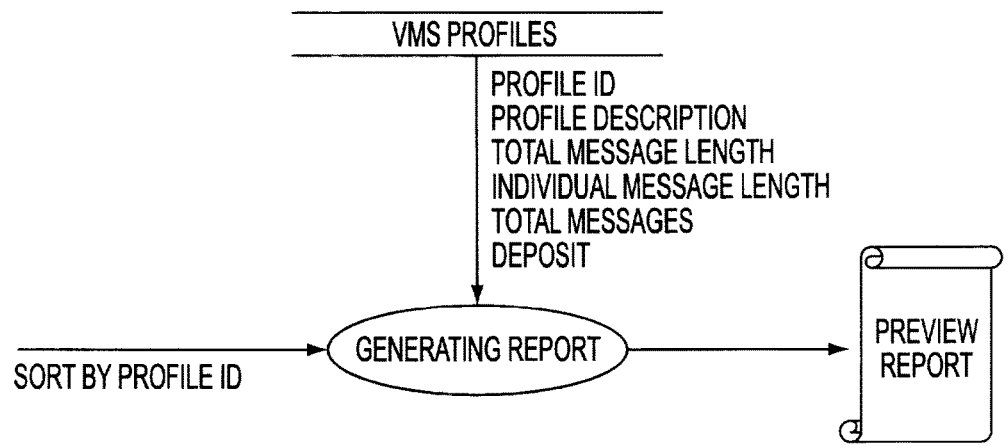
Figure 26A:
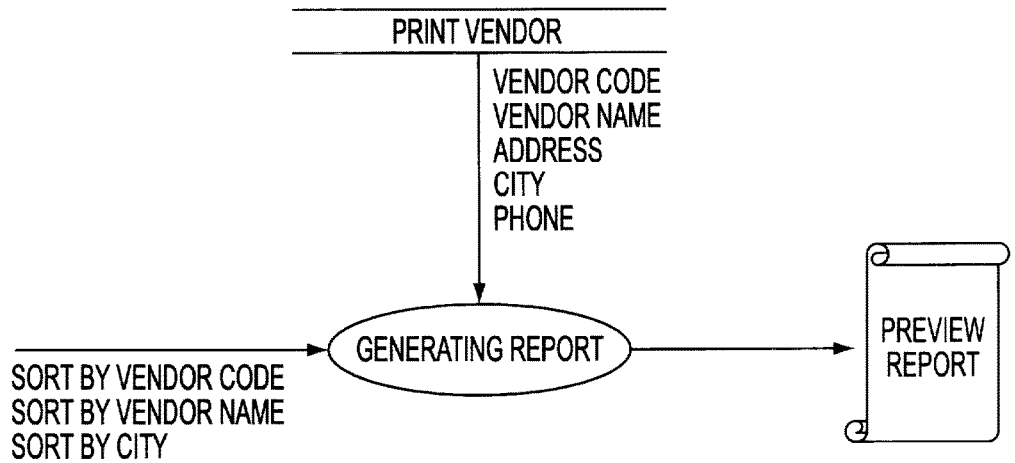
FIGS. 26A and 26B are flow charts of generation of a print vendor report and a moved cards report.
Figure 26B:
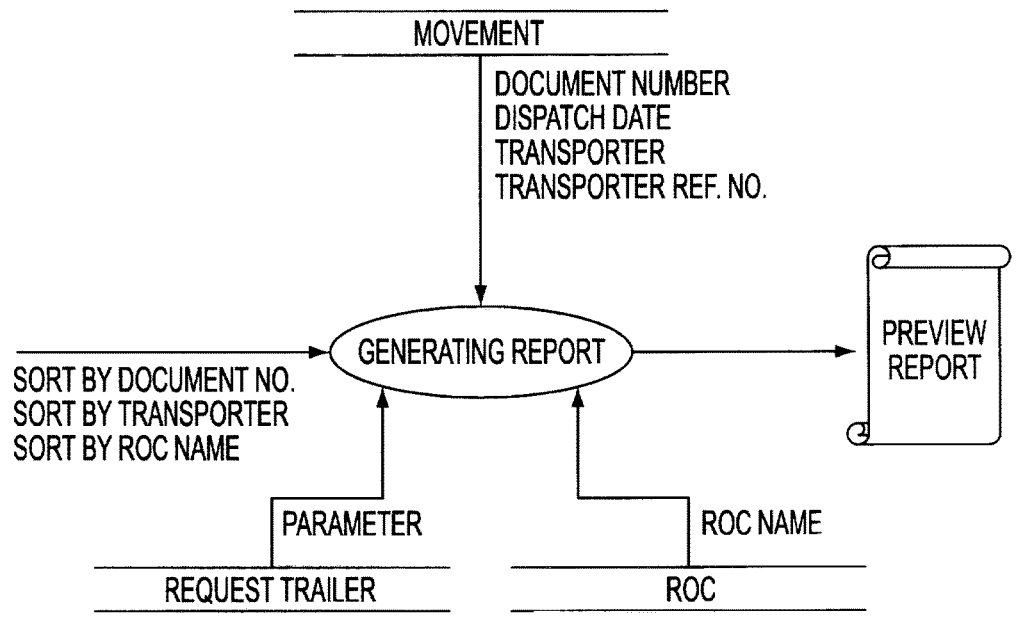

Some of the functions of the Card Manager™ subsystem are provided by batch processes instead of online services. Most notable among these are the steps associated with issuing and managing the access cards 3 and their corresponding PIN numbers. An example of such processing is shown in FIG. 23 for the authentication of mobile cards 3. As a method to avoid fraudulent usage of access cards 3, printed access cards 3 must first be authenticated or registered before the system will accept the usage of the card 3. Such a process is initiated at the central office 71 with a request for additional mobile, or "automobile" cards 3. Once all necessary information associated with the cards 3 is extracted from the system database 33, the card 3 is authenticated by updating its status in the database 33. At this point, the card 3 is available for use by a customer to access the services provided through the inventive system.

FIGS. 24-26B detail the data flow associated with generating various reports. The system provides for generating a plurality of parameter-driven reports, with the parameters being provided by users, provided by the system data stored in the various databases 31, 33, 68, or provided by both. The reports can be generated at the central office 71, the regional office 59, at the distributorships 35, at the sales agents' 37 offices, or remotely through online terminals.

The external carrier and rate plan subsystem (ECRS) subsystem of the Card Manager™ is responsible for maintaining the various network and carrier rate plans available under which customers may be accessing the resources and services available through the system. System users utilize the ECRS subsystem to enter information for maintaining carrier and rate-related information within the system, including information identifying and detailing external carriers, rate plans, networks, nodes, zones, time packages, tariff times, holidays, contact persons, and service maintenance definitions. Through the use of various well known input and query devices, including graphical user interfaces and remote terminals, the users can view, input, modify, and delete any and all information related to the external carriers and various rate plans, with appropriate clearance authority as provided through the system's security subsystem. Each rate plan may be limited by zone, time, date, and user. Additionally, the ECRS provides the resources through which additional surcharges may be added to rate structures for particular services utilized by customers, such as call conferencing, voice mail, facsimile, etc. The ECRS subsystem provides a built-in rating engine for dynamically calculating various usage charges during the delivery of communication services for ensuring that the customer has sufficient balance or limit remaining to purchase the requested services.

A high level application programming interface (HAPI) is a term of art describing the application programming interface that interfaces between the system in accordance with preferred embodiments of the invention and the CTI cards, regardless of the type or manufacturer of CTI card(s) provided. Therefore, by simply updating the HAPI modules to accommodate a new CTI card, the system becomes independent of whatever CTI cards are elected to be used. In other words, HAPI provides a way to keep the application unchanged over multiple vendor CTI cards.

The framework of HAPI provides a set of function calls, structures, events, errors, and constants which are common across all cards supported by HAPI. The application can use these values irrespective of the card used. Thus the application developer need not worry about the target card type on which the application is going to be executed. The programmer need not know the function calls or the programming intricacies of all the type of cards on which the program is going to be run. HAPI shields these from the application and provides a common framework for the application developer. HAPI can be used with analog lines as well as digital (E1/T1/ISDN) lines.

Figure 27:
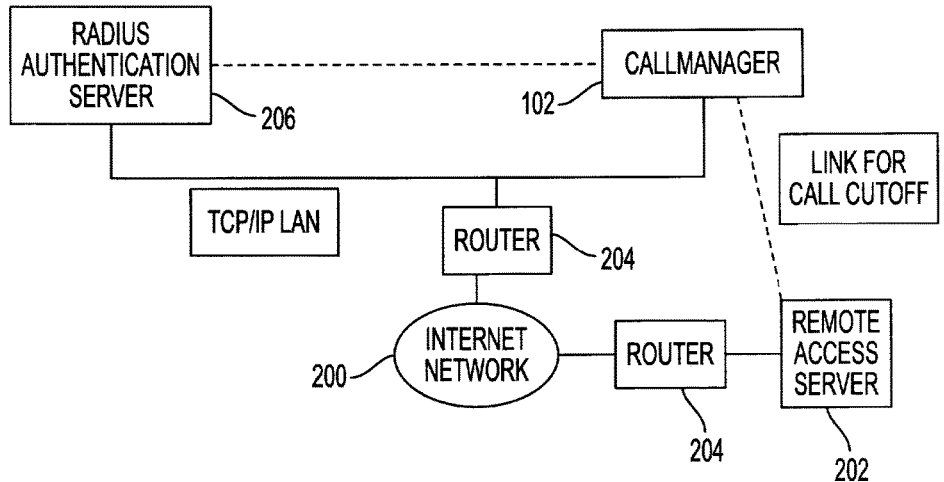
FIG. 27 is a flow chart of operation of the CallManager™ for accessing Internet applications.
Figure 28:
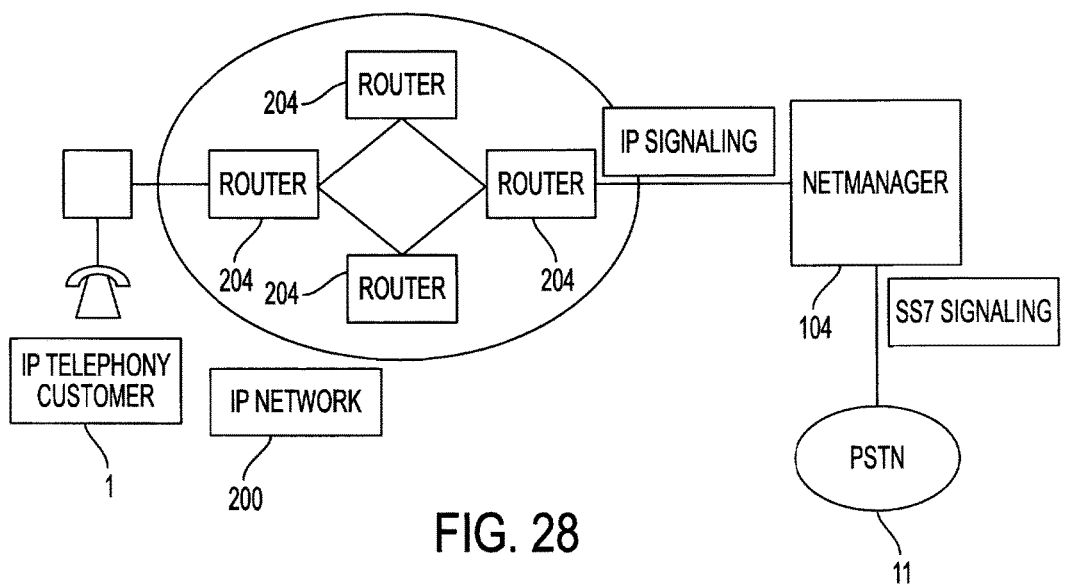
FIG. 28 is a flow chart of operation of the NetManager™ for accessing Internet applications.

While the above discussion has been directed toward providing telephony communication services to the user and subscriber in accordance with preferred embodiments of the invention, the CallManager™ 102 and NetManager™ subsystems can also be utilized to provide Internet or other online services to the user. Specifically, the services of CallManager™ 102 and/or NetManager™ 104 can be used to access any online service currently available through the use of computers and modems, as illustrated by FIGS. 27-28. In such an embodiment of the present invention, the user inquiries would be routed through a remote access server 202 instead of the CallManager™ 102 server 23 or the NetManager™ 104 server 17. The remote access server 202 would then direct the inquiry through a router 204 to connect with the Internet network 200 or any online access service. Once connected, the user would be allowed to conduct any pre-authorized online transaction, such as e-commerce, information inquiry, financial, communication, or entertainment, for example. The rating engine for calculating user charges for receiving services selected would be modified to reflect the cost of accessing the various Internet or online services and features. The rating engine would accommodate charging plans based on service, time, duration, and volume. By way of example and not limitation, a subscriber could sign up for a PIN access card 3 that permits access to e-commerce transactions on the Internet, with such transactions limited to investment trading, auction bidding, and travel purchases, with a specific transaction limit for each such category. The user dials the remote access server 202, which routes the call to the radius authentication server 206 for authentication. The radius authentication server 206 sends information to the CallManager™ 102 upon authentication. The CallManager™ 102 accesses the users account and responds to the radius authentication server 206 whether there is sufficient balance in the account and whether the requested service is valid for this users account. The user is connected to the Internet or online service, and the CallManager™ 102 keeps track of the elapsed time. Charges, such as online purchases, accrued by the user during connection are levied against the users account balance. The above is also referred to as real time authorization and real time debiting. If the customer 1 disconnects before exhaustion of the account balance, the radius authentication server 206 notifies the CallManager™ 102 of the call termination, and the CallManager™ 102 then updates the users account balance. If the balance is exhausted during the call, the CallManager™ 102 sends a termination message to the remote access server 202, which so notifies the user and terminates the connection.

Providers are presently implementing Internet 200 and other online networks to carry voice and multimedia traffic, in addition to utilizing traditional switched telephony networks. NetManager™ 104, as a call-processing engine for a PSTN user, can also be used as a gateway for providing enhanced voice and multimedia services on the Internet 200 or other online networks, as illustrated in FIG. 28. In this embodiment, NetManager™ 104 accepts all telephony calls for digit analysis. If NetManager™ 104 determines that the call is within the Internet 200 or other online network, NetManager™ 104 translates the destination digits to the corresponding Internet address and sends the call back to the Internet 200 or other online network. If the call is for the PSTN, NetManager™ 104 performs a gateway function and routes the call to the PSTN over signaling links, such as MFC-R2, ISDN-PRI, or SS7. The NetManager™ 104 then provides all requested and authorized telephony services to both the Internet and the PSTN customers.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. At least one non-transitory computer readable medium encoded with processing instructions performed by at least one computer platform performing a method of providing authorized communication services or transactions using a communication network, including at least networks of different types which are external to the platform, user devices communicating with the platform via the communication network, the method comprising:
   accepting and processing, by the platform, a request to provide at least one of a communication service, a transaction or user account information via one of the external networks;
   verifying at the platform that the requestor is authorized to receive the at least one of the communication service, the transaction, or the user account information, and that an account associated with the user has a sufficient amount currently available for payment of the at least one of the communication service or the transaction; and
   charging at the platform by logging transactions on a real-time basis to an authorized account associated with the user, while the platform controls an element of a corresponding one of the external networks to provide at least one of the communication service or the transaction as provided by any one of a plurality of different service and transaction providers.

2. The non-transitory computer readable medium of claim 1, wherein the method further comprises logging in real-time settlement data for the at least one of the communication service or a commercial transaction.

3. The non-transitory computer readable medium of claim 1, wherein the verifying further comprises authenticating the user using at least one of a security code, a password, user intervention, a PIN number, automatic call back or interactive voice response.

4. The non-transitory computer readable medium of claim 1, wherein the method further comprises verifying at the platform that the user is within a specified area, country or that the at least one of the communication service or the transaction requested is within a user feature restriction level.

5. The non-transitory computer readable medium of claim 1, wherein the charging includes at least one of decreasing an account balance of a pre-authorized account or increasing a balance of a charge account.

6. The non-transitory computer readable medium of claim 1, wherein the method further comprises recording information, at the platform, about the at least one communication service or the transaction, including at least one of location of the authorized user, an amount charged, a date, a time or a type of transaction.

7. The non-transitory computer readable medium of claim 1, wherein the communication network includes at least one of a wireless communication network,
   a publicly switched telephone network, a landline communication network and a SS-7 signaling network, and wherein the external networks of different types connected to the platform include a global or wide area computer network, the internet, a TCP/IP LAN, an IP signaling network and a router network.

8. The non-transitory computer readable medium of claim 1, wherein the method further comprises providing services from the platform on at least one of the communication network and the external networks selectable between user account management functions, payment administration functions, rate plan functions, and security functions.

9. The non-transitory computer readable medium of claim 1, wherein the method further comprises:
   disconnecting, by the platform, the user from at least one of the external networks of different types after the at least one of the communication service or the transaction is provided; and
   re-establishing a connection with the disconnected user by the platform via the communication network and advising the disconnected user of a balance remaining in the account associated with the disconnected user.

10. The non-transitory computer readable medium of claim 1, wherein the method further comprises:
   determining, by the platform, while providing the one of the communication service and the transaction that the user no longer has a sufficient amount in the account associated with the user; and
   if it is determined that there is no longer the sufficient amount, accepting an account number across the at least one of the external networks of different types and adding value to the account associated with the user from the accepted account number.

11. A non-transitory computer readable medium encoded with processing instructions performed by at least one computer to provide a method of providing pre-authorized communication services and transactions using a communication network, including at least one switch, and external networks of different types and which are external to a platform, devices communicating with the platform via the communication network, the method comprising:
   accepting, at the platform, a request via a corresponding one of the external networks, the request requesting at least one of a communication service or a transaction;
   verifying, by the platform, that the requestor is authorized to receive the at least one of the communication service or the transaction, and that an account associated with the requestor has a sufficient value available for payment; and
   charging, by logging in real time at the platform outside of the external networks, using rating engines that dynamically calculate charges, an account associated with the requestor while the platform controls an element of a corresponding one of the external networks from the platform to provide by any one of a plurality of different service and transaction providers the at least one of the communication service or the transaction and authorizing the transaction if the accepting and verifying is successful.

12. The non-transitory computer readable medium of claim 11, wherein the verifying includes authenticating the requesting device using at least one of a security code, a password, user intervention, a PIN number, automatic call back or interactive voice response.

13. The non-transitory computer readable medium of claim 11, wherein the method further comprises verifying, by the platform, that the requestor is within a specified area, country or that the at least one of the communication service or the transaction requested is within a requestor feature restriction level.

14. The non-transitory computer readable medium of claim 11, wherein the charging includes at least one of decreasing an account balance of a pre-authorized account or increasing a balance of a charge account.

15. The non-transitory computer readable medium of claim 11, wherein the method further comprises recording, at the platform, information about the at least one communication service or the transaction, including at least one of location of the authorized requestor, an amount charged, a date, a time or a type of transaction.

16. The non-transitory computer readable medium of claim 11, wherein the communication network includes at least one of a wireless communication network, a publicly switched communication network, a landline communication network and aSS-7 signaling network, and wherein the external networks of different types controllable by the platform include a global or wide area computer network, the internet, a TCP/IP LAN, an IP signaling network and a router network.

17. The non-transitory computer readable medium of claim 11, wherein the method further comprises providing services of at least one of requestor account management functions, payment administration functions, rate plan functions, or security functions.

18. The non-transitory computer readable medium of claim 11, wherein the method further comprises logging real-time settlement data for the at least one of the communication service or commercial transaction.

19. A user communication device communicating with a platform outside of and connected to a communication network, including at least one switch, and external networks of different types, comprising:

an input unit that receives a request from a user identifying at least one of a communication service, a transaction or user account information; and a transmitter that transmits the request to the platform via one of the external networks or the communication network for verification that the user is authorized to receive the identified at least one of the communication service, the transaction or the user account information via one of the external networks, and that an account associated with the user has a sufficient amount currently available for payment of the identified at least one of the communication service or the transaction, and for control of an element of one of the external networks from the platform such that at least one of different service and transaction providers at least one of authorizes the identified transaction or provides at least one of the identified communication service or the identified user account information, while the authorized account associated with the user registers a charge by the platform in real time in response to verification of the request.

20. The user communication device of claim 19, wherein the transmitter further reads an access code and a link between the account and the request, and transmits the read access code and the link to the platform to perform verification.

21. The user communication device of claim 19, wherein the transmitter further reads information from a chip needed by the platform to perform verification, and transmits the read information to the platform.

22. The user communication device of claim 19, wherein the transmitter further comprising a receiver that receives the at least one of a communication service or the transaction to be provided using the user communication device from the at least one of a plurality of different service and transaction providers.

23. The user communication device of claim 19, wherein the user communication device comprises a mobile communication.

24. The user communication device of claim 19, wherein the user communication device comprises a computer.

25. A method of crediting a authorized account of a user, comprising:

sending a notification to a transceiver associated with a user that the authorized account needs additional credit;

receiving a response message from the transceiver associated with a user and including a number associated with the transceiver associated the user;

sending a request from a first platform to a second platform, connected together and to external networks of different types, to obtain the additional credit from another account associated with the user and maintained by the second platform; and receiving the additional credit obtained from a transaction debiting the other account and adding the additional credit to the authorized account maintained by another platform different than and connected to the second platform via one of the external networks of different types, to supply funds used for at least one communication service or transaction, provided or consummated respectively via at least one of the networks of different types which are connected to the first and second platforms.

26. The method according to claim 25, further comprising authenticating at the first platform that the user is associated with the pre-authorized account, and wherein said sending of the request from the first platform to the second platform occurs if it is authenticated that the user is associated with the pre-authorized account.

27. The method according to claim 25, further comprising establishing at the first platform an identification number associated with the user, and wherein said authenticating of the user is based on the identification number.

28. The method according to claim 25, further comprising establishing at the first platform an identification number associated with the user, and wherein said authenticating of the user is based on the identification number.

* * * * *